Oct. 26, 1971  HAN-ICHIRO NAITO ET AL  3,615,122
SHIFTABLE STACK ASSEMBLY OPERATING SYSTEM
Filed Feb. 12, 1969  21 Sheets-Sheet 9

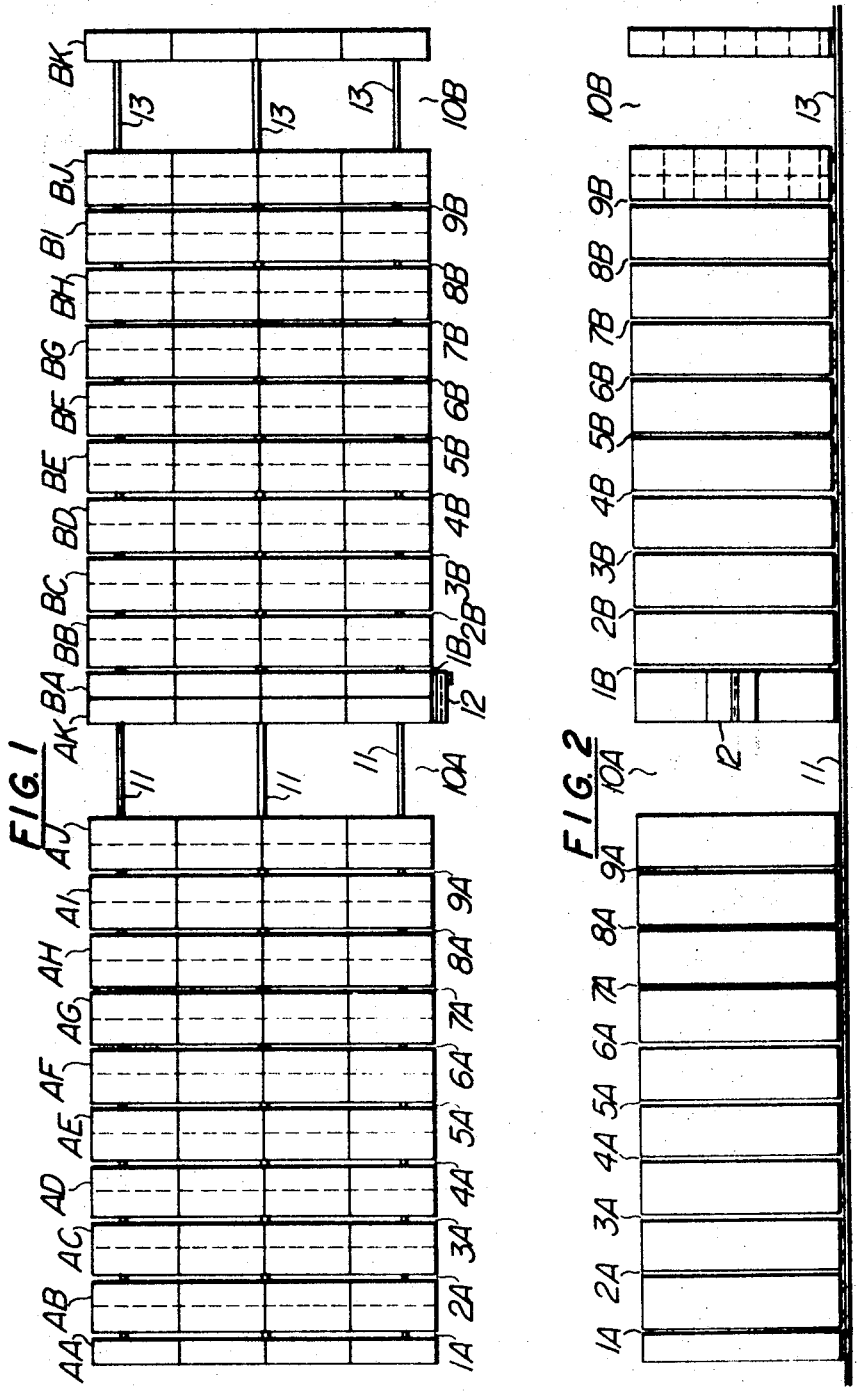

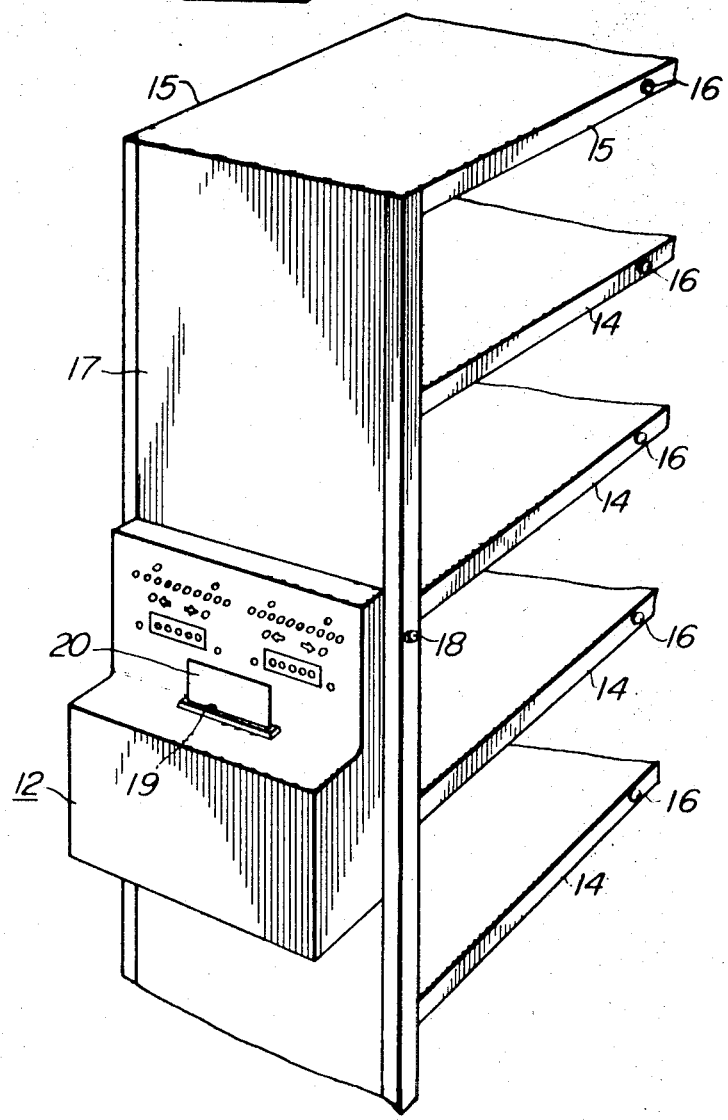

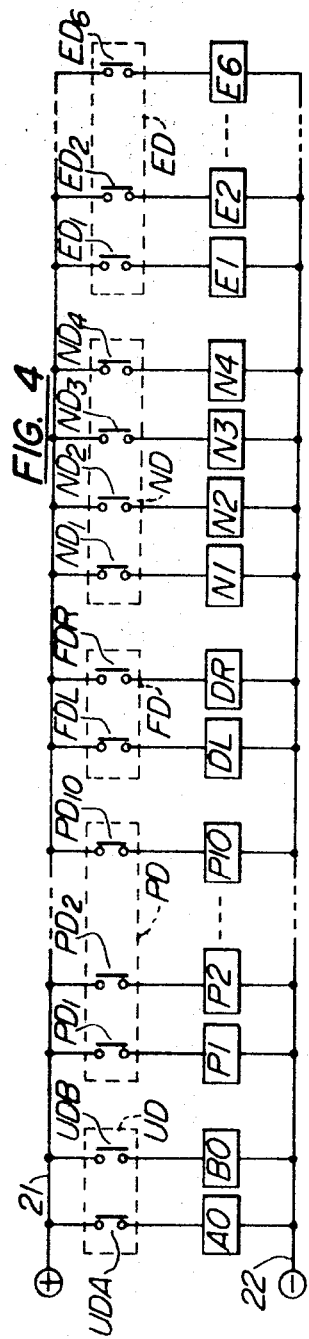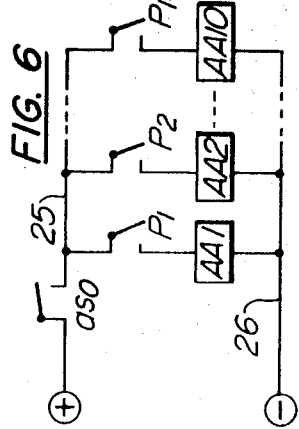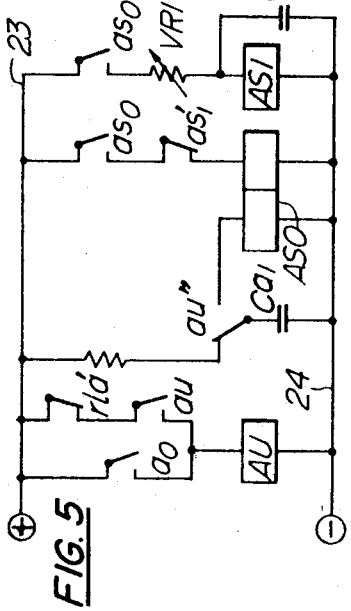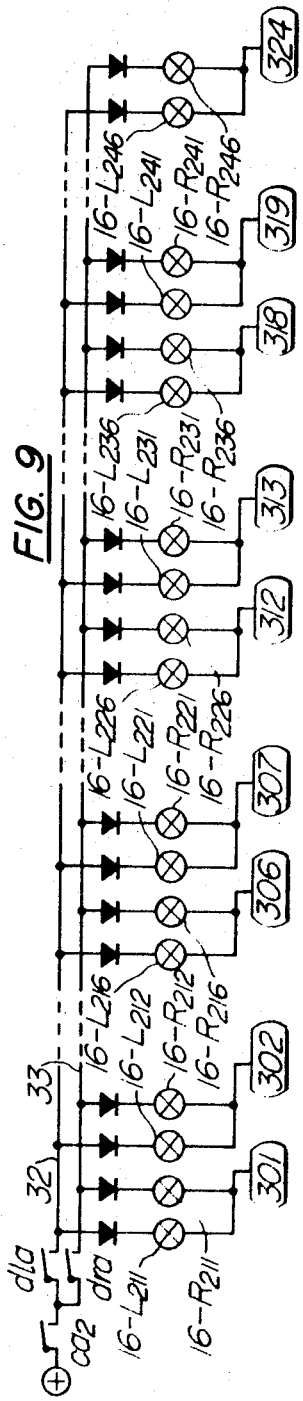

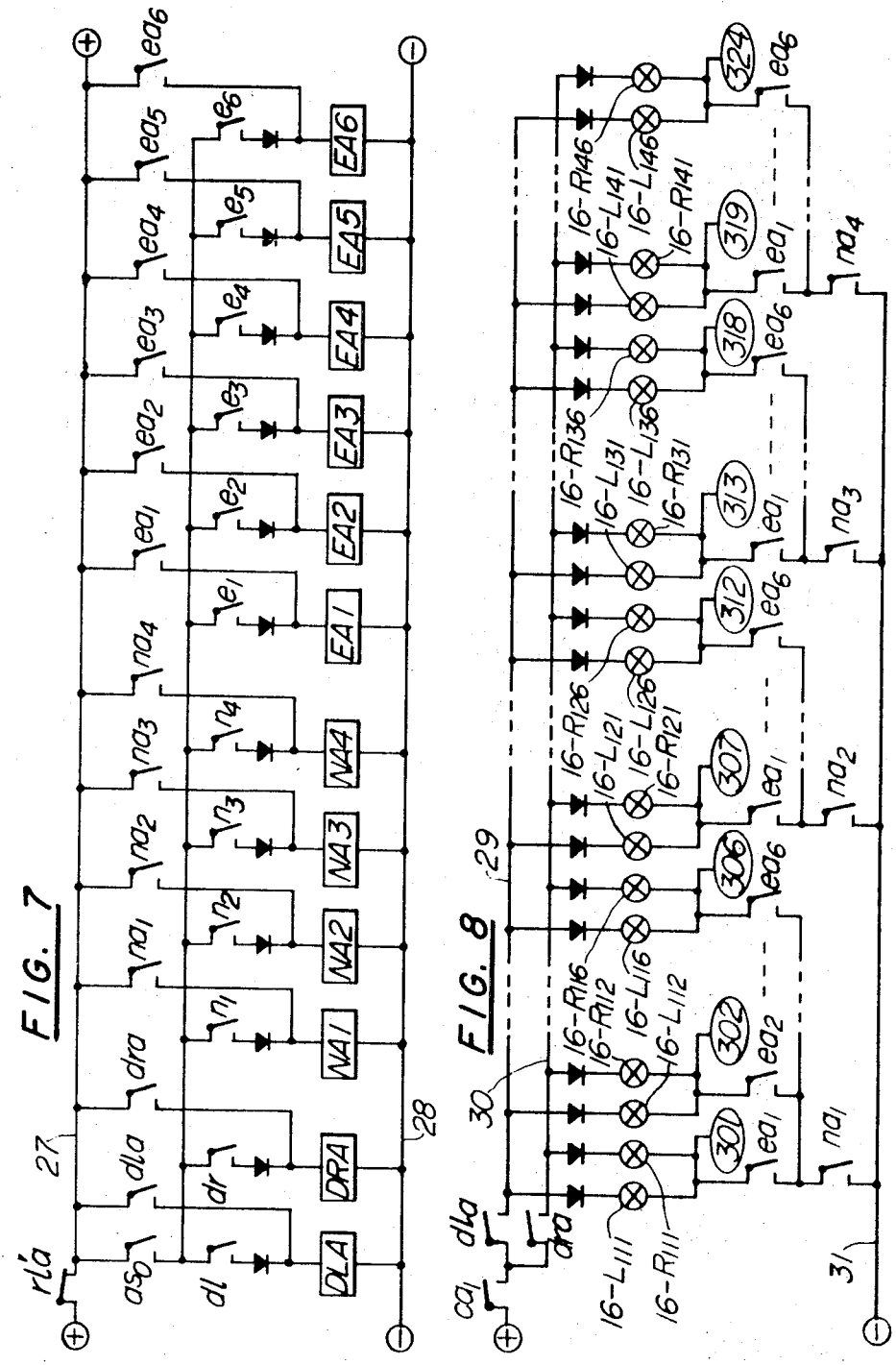

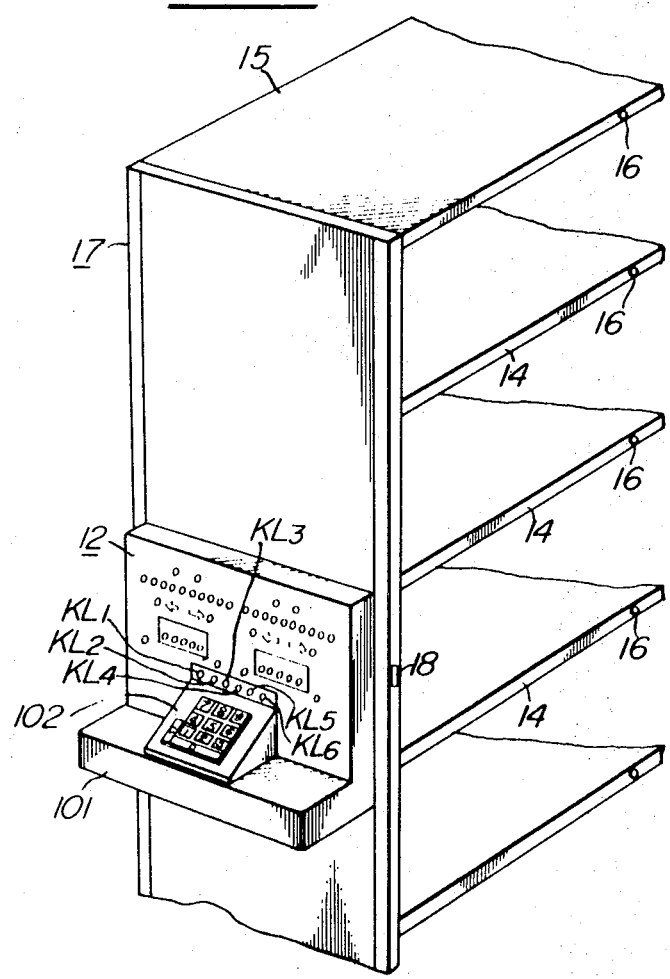

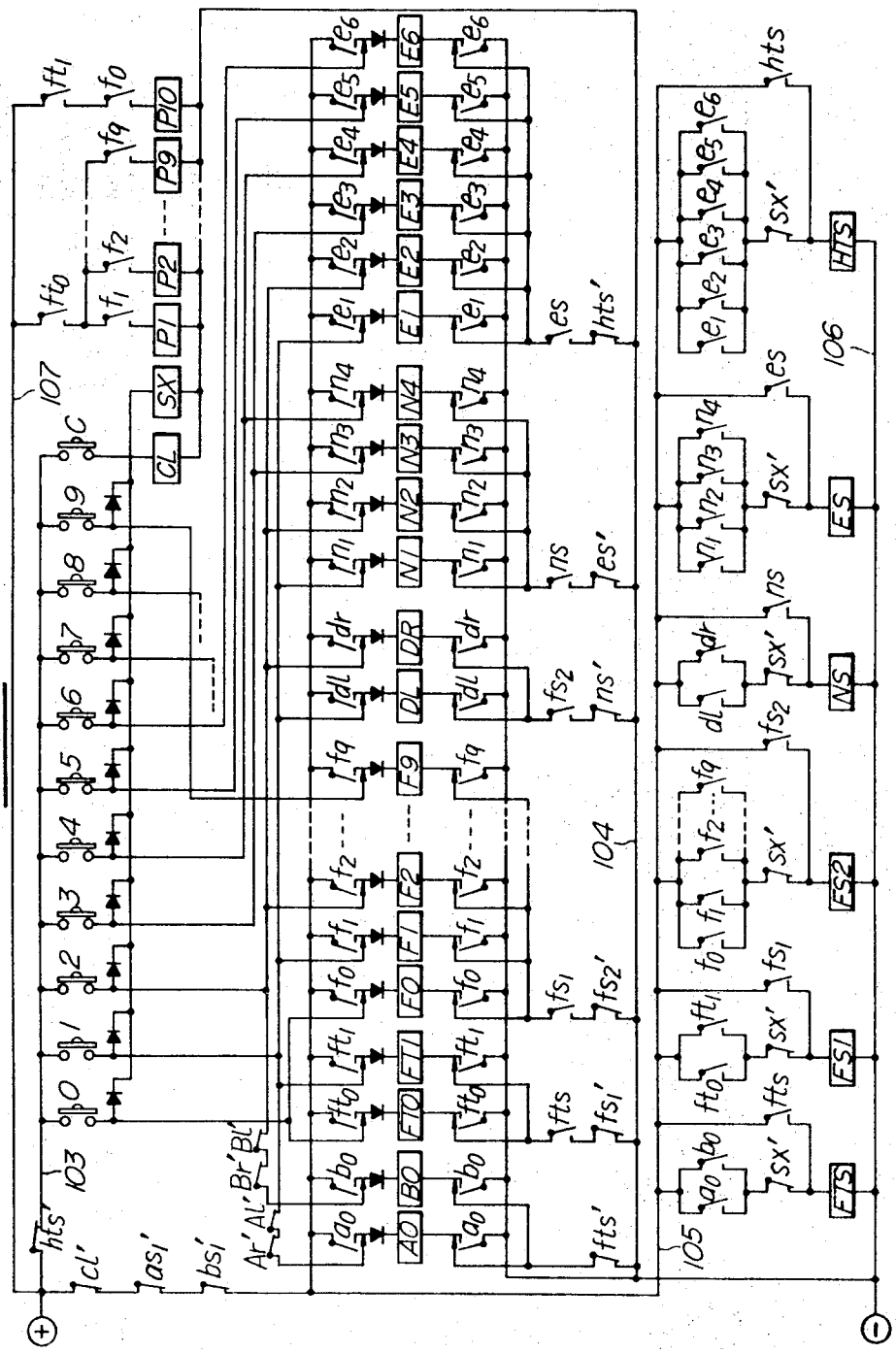

INVENTORS
HAN-ICHIRO NAITO
TSUNEO YAMAGUCHI

BY Richard L. Cannaday
ATTORNEY

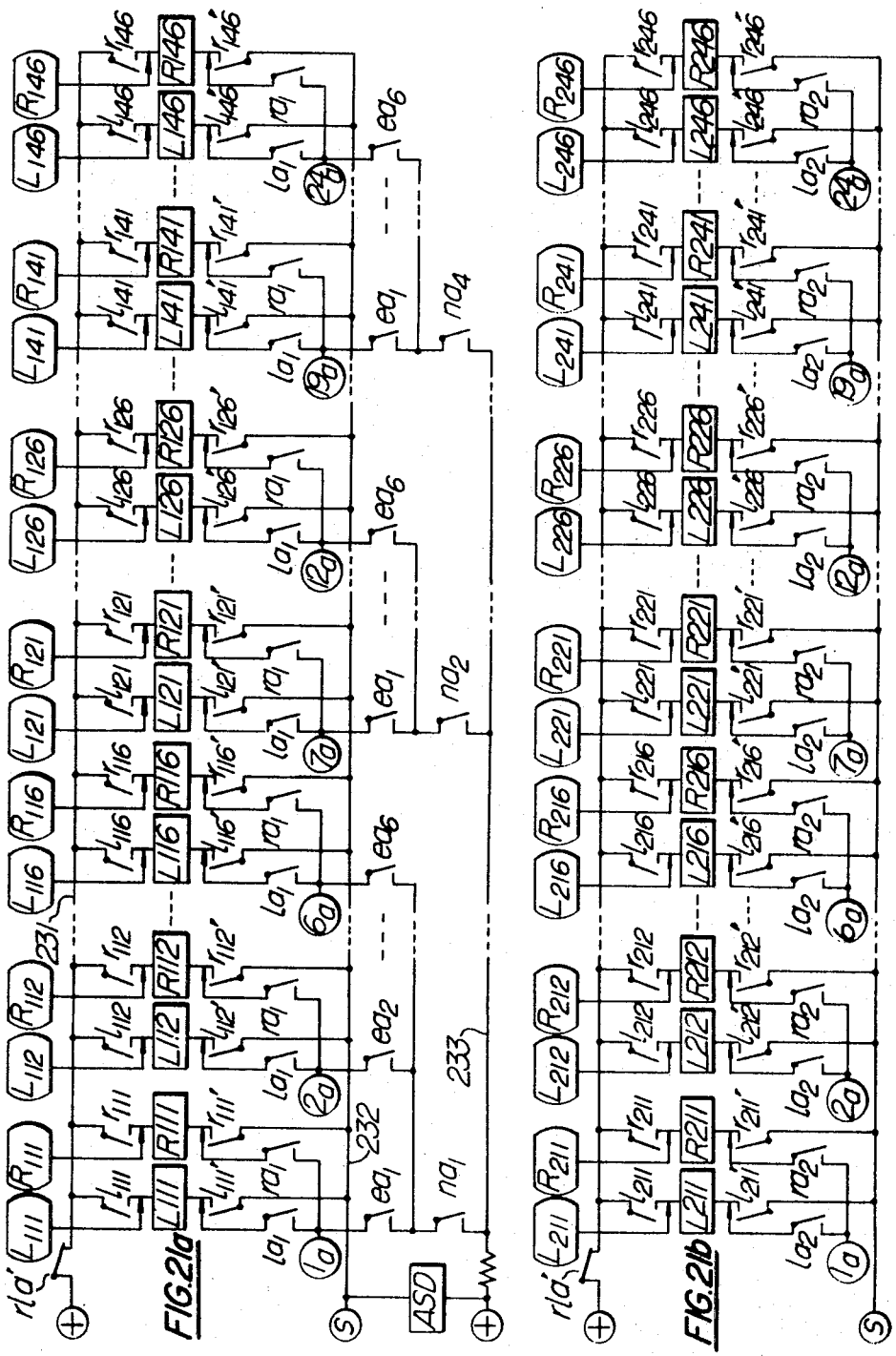

Oct. 26, 1971  HAN-ICHIRO NAITO ET AL  3,615,122
SHIFTABLE STACK ASSEMBLY OPERATING SYSTEM
Filed Feb. 12, 1969  21 Sheets-Sheet 13
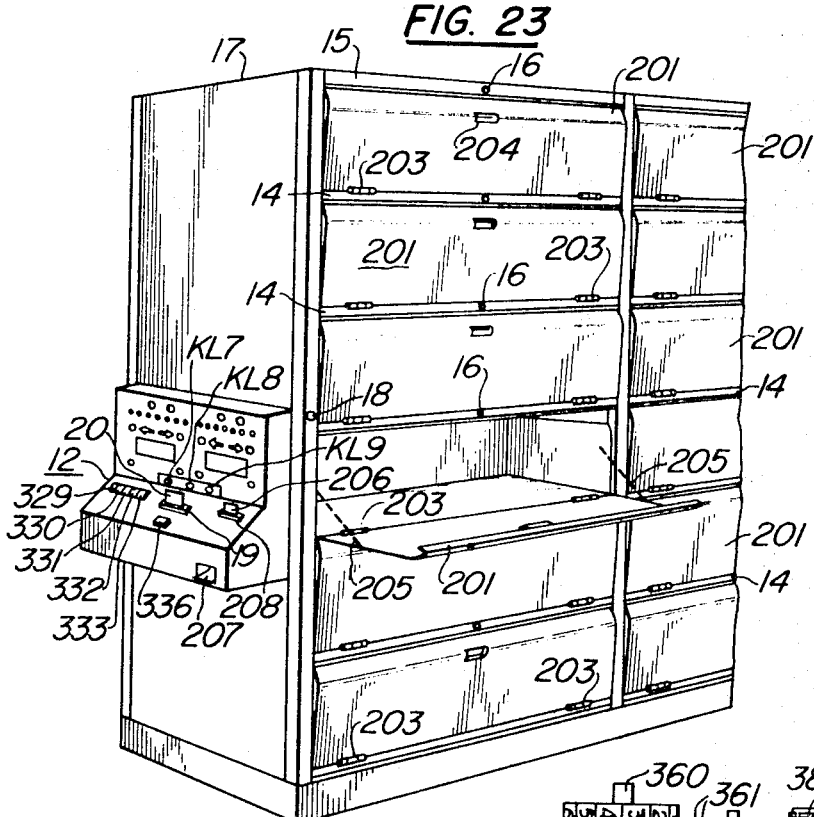
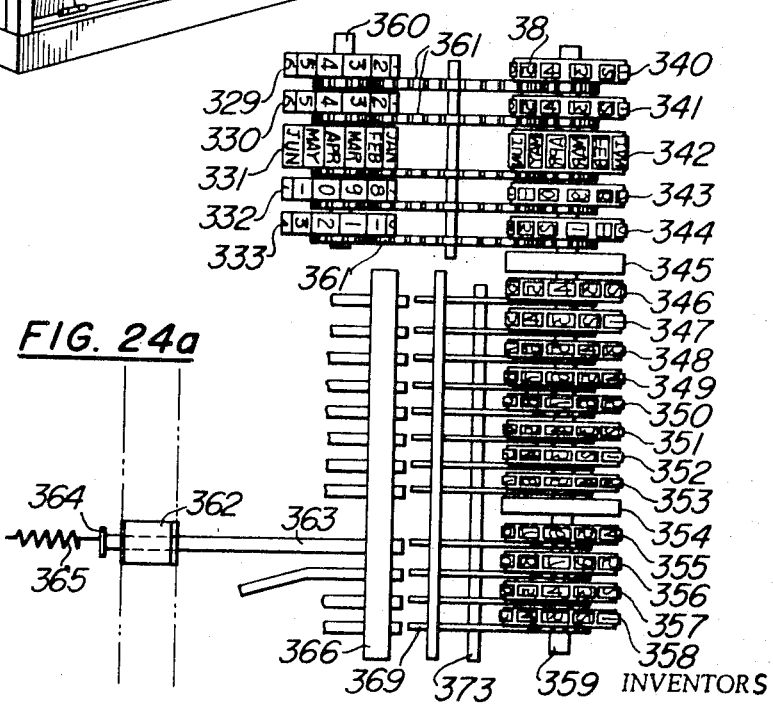
INVENTORS
HAN-ICHIRO NAITO
TSUNEO YAMAGUCHI
BY Richard T. Cannaday
ATTORNEY

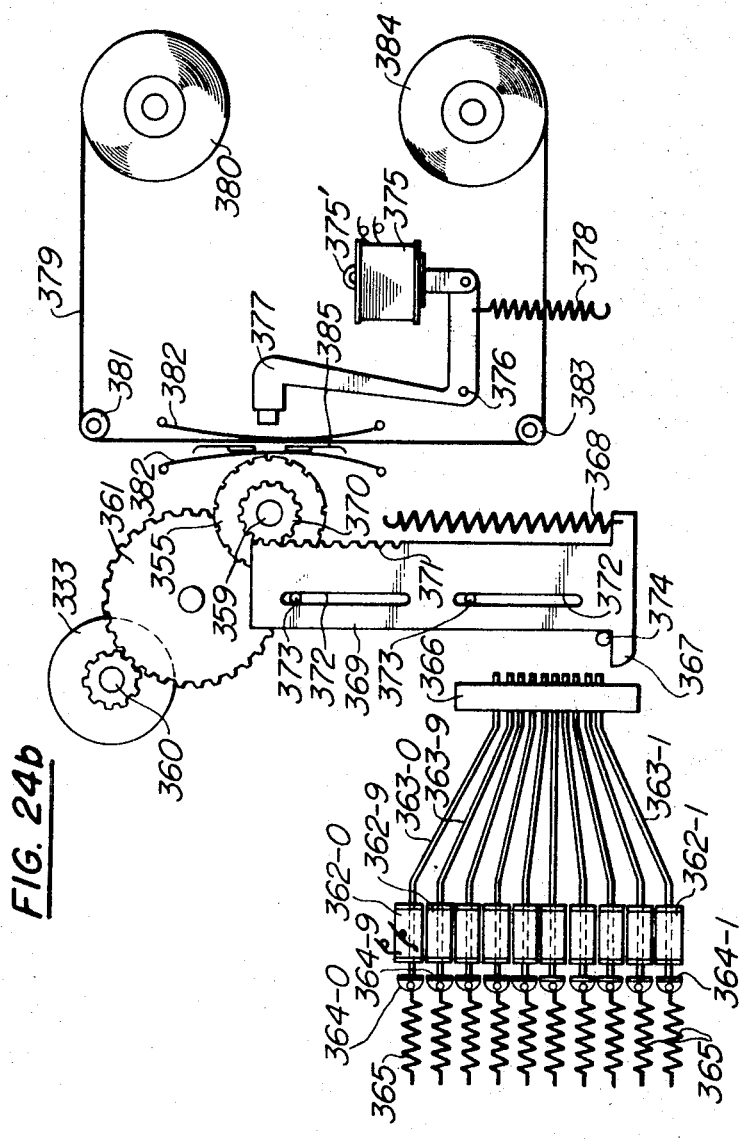

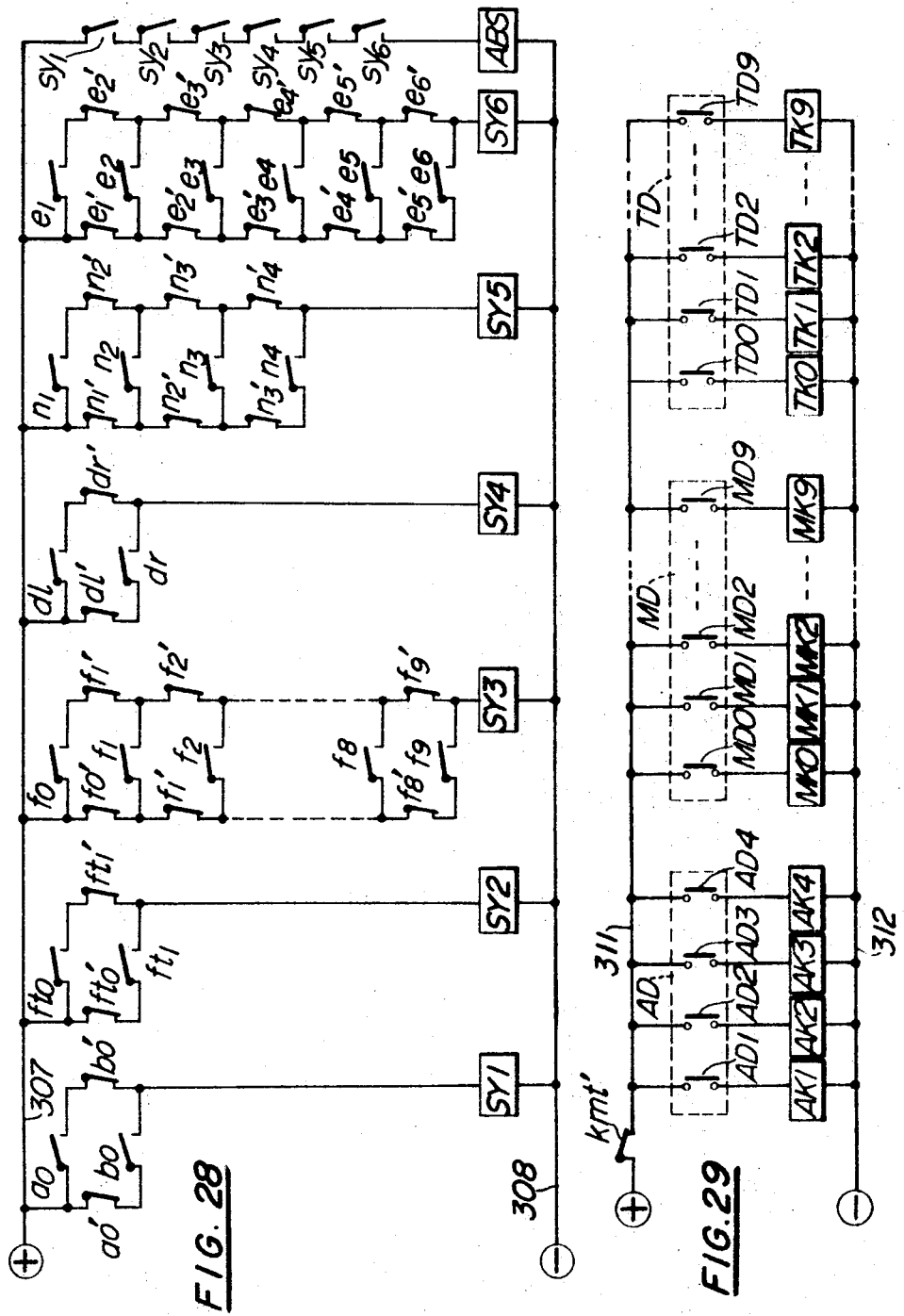

INVENTORS
HAN-ICHIRO NAITO
TSUNEO YAMAGUCHI

BY Richard L. Cannaday

ATTORNEY

INVENTORS
HAN-ICHIRO NAITO
TSUNEO YAMAGUCHI

BY Richard T. Cannaday
ATTORNEY

United States Patent Office 3,615,122
Patented Oct. 26, 1971

3,615,122
SHIFTABLE STACK ASSEMBLY OPERATING SYSTEM
Han-Ichiro Naito, Akishima-shi, and Tsuneo Yamaguchi, Tokyo, Japan, assignors to Elecompack Company Limited, Tokyo, Japan
Filed Feb. 12, 1969, Ser. No. 798,580
Claims priority, application Japan, Feb. 15, 1968, 43/9,157; Mar. 5, 1968, 43/13,799; June 13, 1968, 43/40,246; Oct. 5, 1968, 43/72,776; Dec. 7, 1968, 43/89,832
Int. Cl. A47b 53/00
U.S. Cl. 312—199
12 Claims

ABSTRACT OF THE DISCLOSURE

A system for operating a shiftable stack assembly which is so designed that a desired aisle is automatically formed in accordance with a position card on which the storage position of an article accommodated in the stack assembly and desired to be taken out therefrom is previously recorded or by operating keys on a keyboard in accordance with a code number representative of the storage position information, or the operation of the shiftable stack assembly is restricted by a qualification, and further the date of operation, the operator, storage position, etc. are recorded automatically.

---

Figure 13:
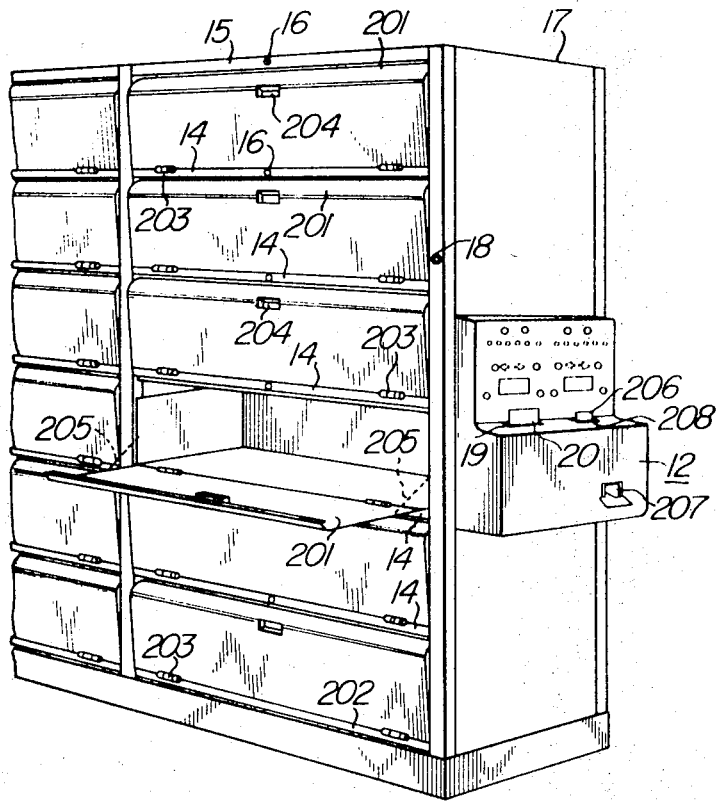

The present invention relates to shiftable stack assemblies and more particularly to such shiftable stack assemblies which are operated by means of a position card, a keyboard or the like.

A shiftable stack assembly of the type comprising a large number of shelves or stacks shiftably arranged on the floor by suitable means, so that the stacks can be aligned closely to each other with no interval between adjacent ones when they are not in use, whereas a selected stack is shifted to form an aisle between it and the adjacent stack when an article or articles stored therein is or are desired to be taken out, has been proposed, for example, in U.S. patent specification No. 3,168,361 to Y. Naito. However, since the conventional shiftable stack assemblies of the type described above are merely so designed that an aisle is formed at a desired location by operating an aisle opening and closing push-button on a control panel, they are only adapted for storing articles irrespective of their locations and furthermore with such stack assemblies the types of articles which can be stored in the stack assembly are limited to only several kinds. Namely, the push-button system for opening and closing an aisle has been sufficiently satisfactory for use with a shiftable stack assembly which is designed to store only several kinds of articles by kind or which comprises a relatively small number of shiftable stacks, but is not satisfactory for use with such a shiftable stack assembly in which a wide variety of articles are to be stored by kind of article or which comprises a large number of stacks or a plurality of shiftable stack assembly units, because much time and labor are required for determining the selected aisle and position in said aisle where the desired article is stored or to be stored. This tendency becomes more apparent as the number of stacks or kinds of articles stored or to be stored increases.

An object of the present invention is to provide a shiftable stack assembly operating system which eliminates the aforesaid defects of the conventional shiftable stack assembly and which is so designed that the aisle through which a desired article is stored or taken out is opened automatically and the position in which said article is stored or to be stored is indicated by an indicator lamp upon insertion into a control panel of a signal or a card, such as a punch card, a mark card, a magnetic card or the like, in which the position of the article is memorized by kind or individually, whereby the storage of articles is facilitated.

Another object of the present invention is to provide a shiftable stack assembly operating system which singly is capable of operating a shiftable stack assembly comprising a plurality of unit assemblies.

Still another object of the invention is to provide a shiftable stack assembly operating system wherein each stack of the shiftable stack assembly is provided with a lockable closure member for storage of confidential articles or unstable articles or for preservation of articles over a prolonged period by protecting them against dust, said closure member being unlocked upon formation of the associated aisle.

Still another object of the invention is to provide a shiftable stack assembly operating system which is so designed that a desired aisle is opened and the position of a desired article is indicated by an indicator lamp automatically upon depressing a set of keys from 0 to 9 in accordance with a code number representing the position of the individual kind of article or individual articles stored.

Still another object of the invention is to provide a shiftable stack assembly operating system which is so designed that an aisle through which a desired article becomes accessible is opened only when a signal from a position card or a keyboard, representing the position of the desired article, falls in the range specified by a signal representing the qualification of a specific attendant, that is, the section of the stack assembly, the articles in which said attendant is authorized to handle, so that no single attendant is permitted to handle all the articles stored in the stack assembly, said qualification signal being previously assigned for each attendant, separately from said position signal, and stored in a qualification card, such as a mark card, a punch card, a magnetic card or the like.

Still another object of the invention is to provide a shiftable stack assembly operating system which is provided with means for recording the stack or article handled in the manner described above, along with the date on which said stack or article was handled.

Still another object of the invention is to provide a shiftable stack assembly operating system which is provided with means for recording the number of the aforesaid qualification card when said qualification card was used.

Figure 12:
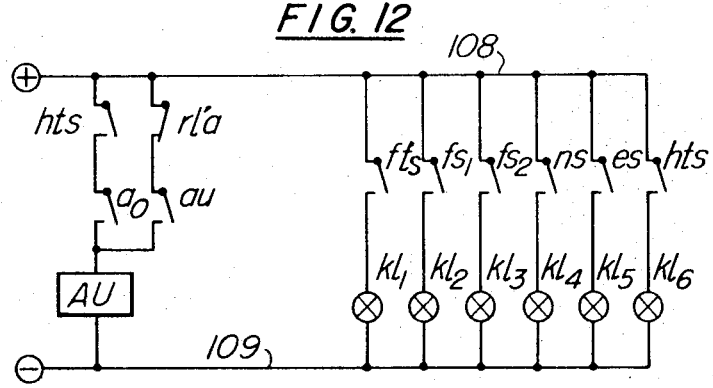
Figure 14:
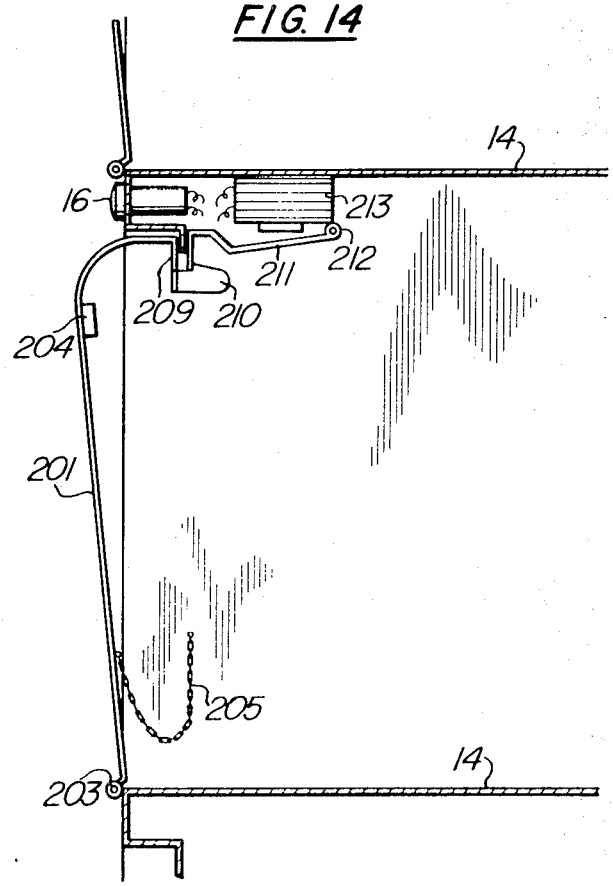
Figure 15:
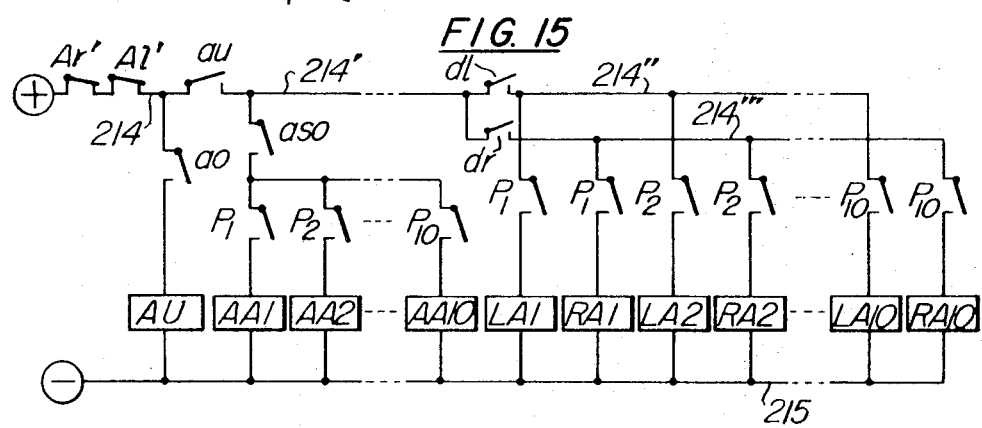
Figure 16:
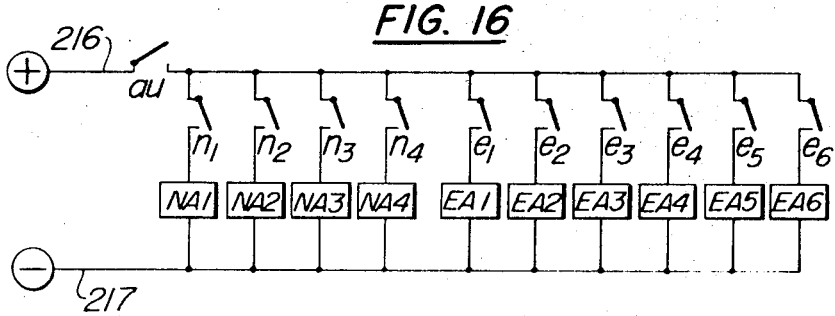
Figure 17:
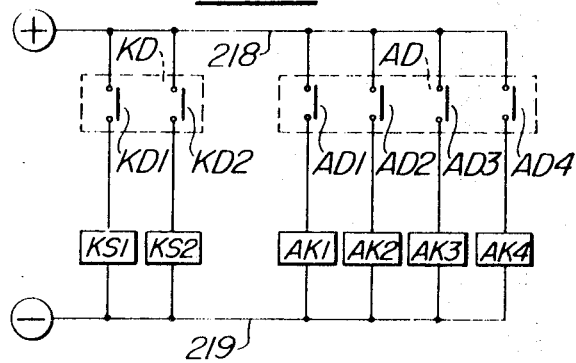
Figure 18:
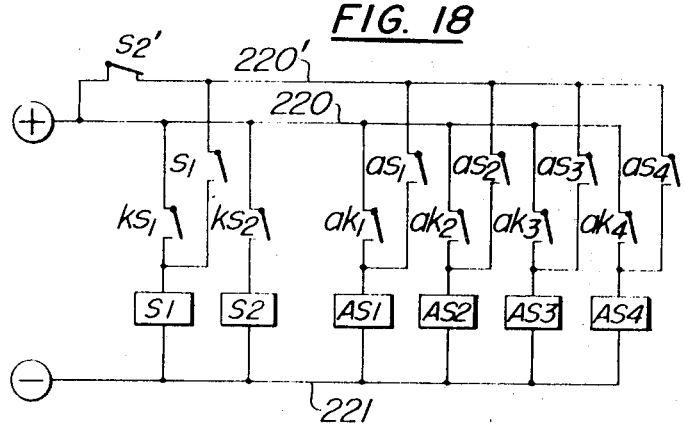
Figure 19:
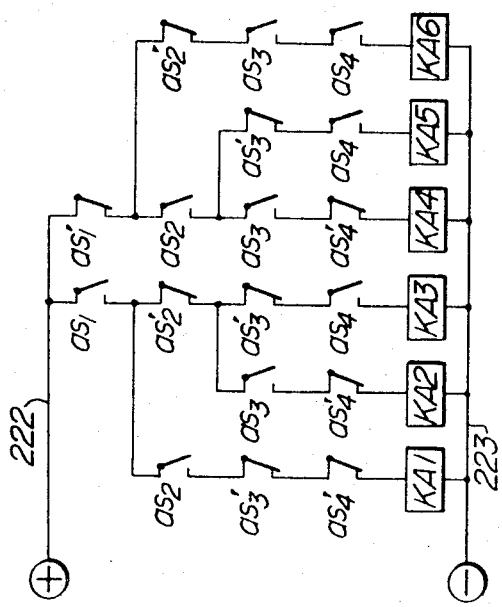
Figure 22:
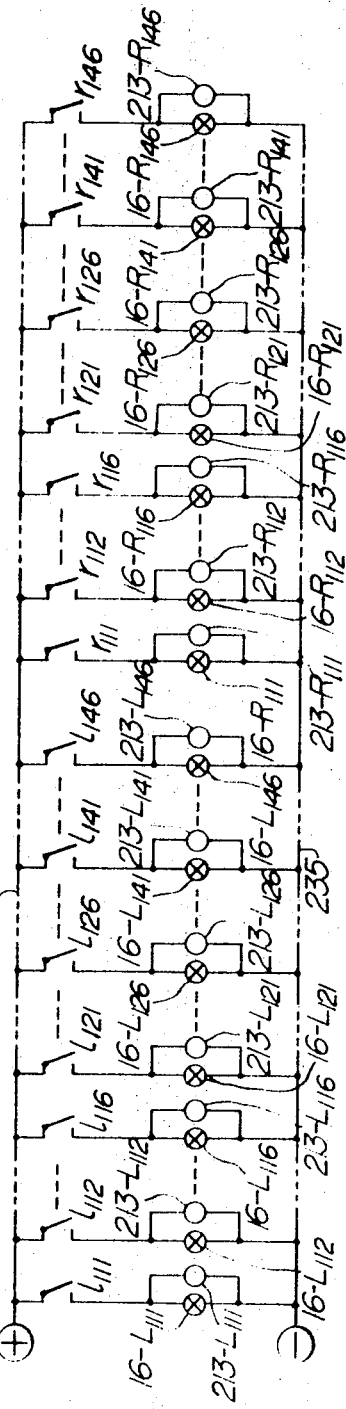
Figure 20A:
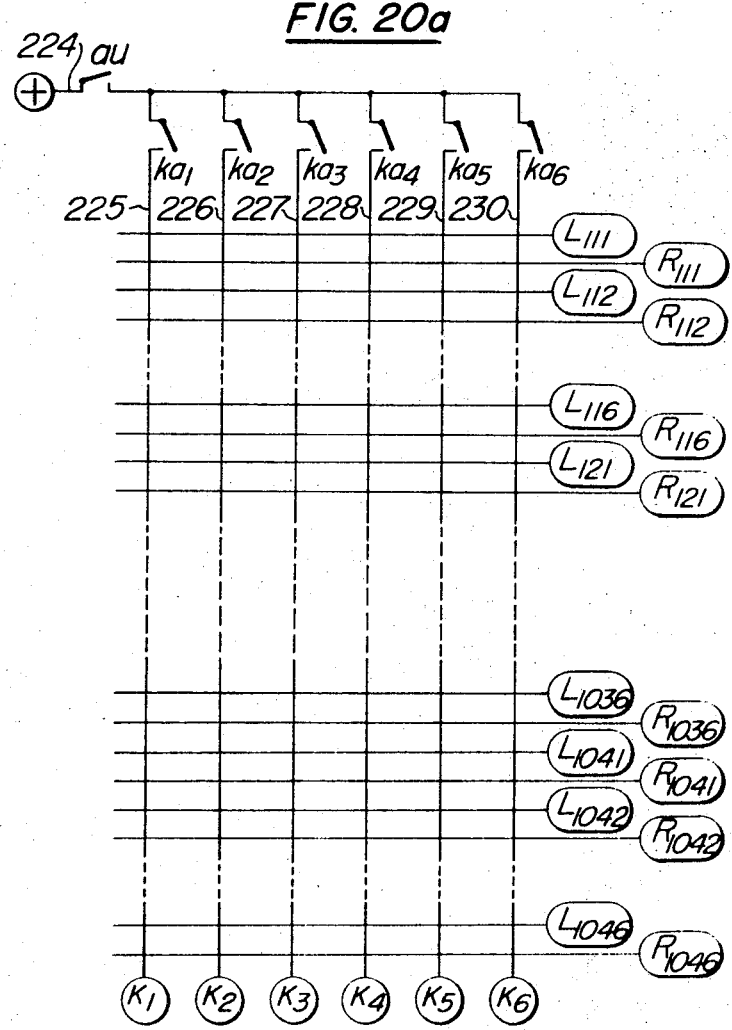
Figure 20B:
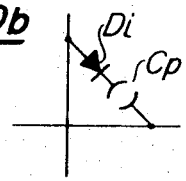
Figure 25:
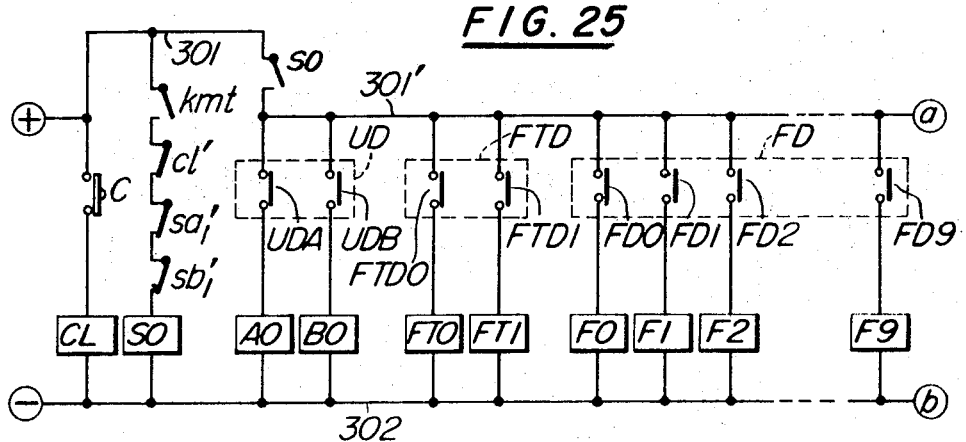
Figure 26:
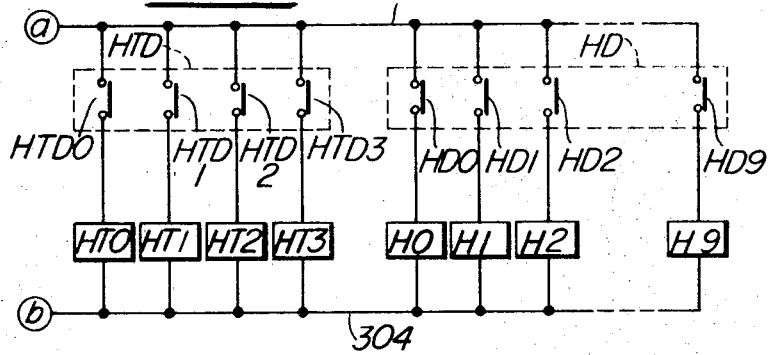
Figure 27:
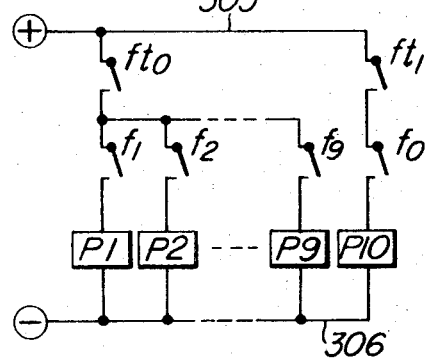
Figure 30:
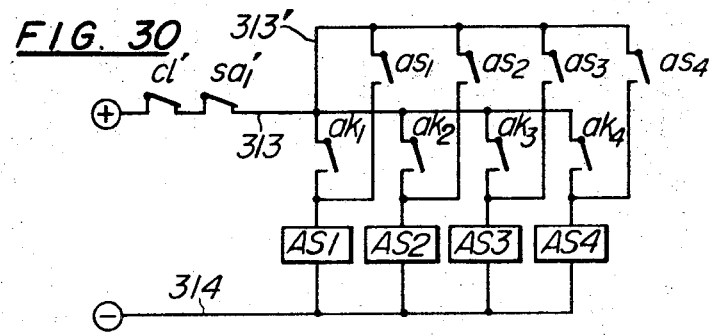
Figure 31:
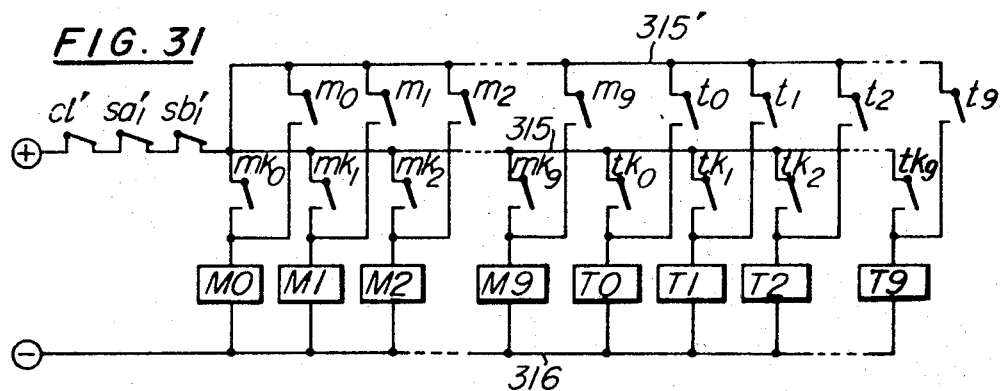
Figure 34:
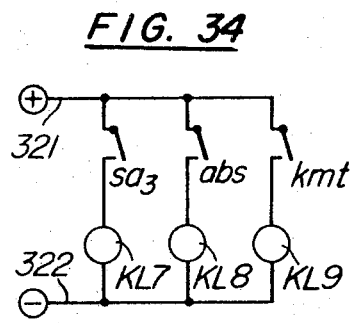
Figure 35:
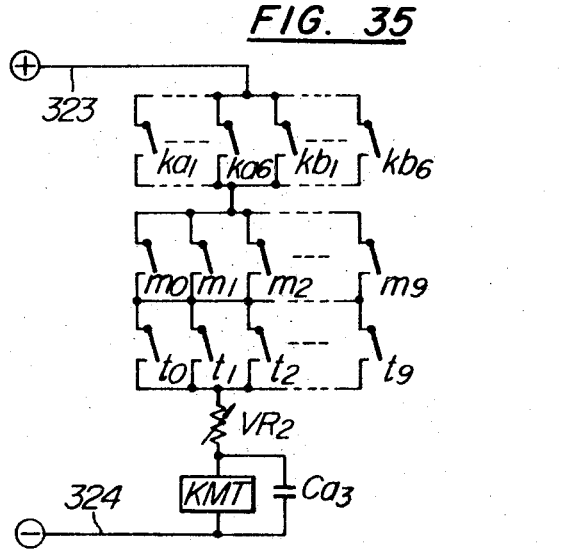
Figure 32:
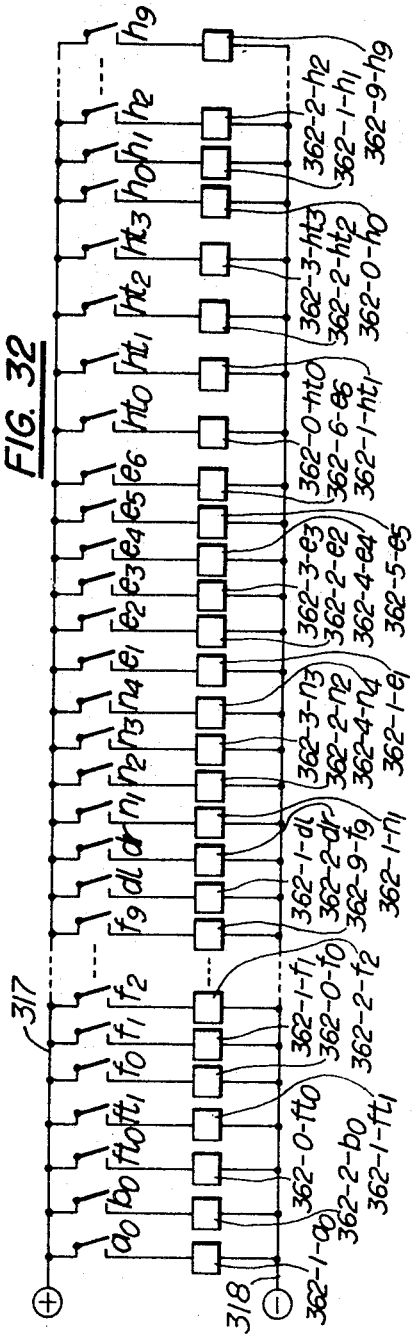
Figure 33:
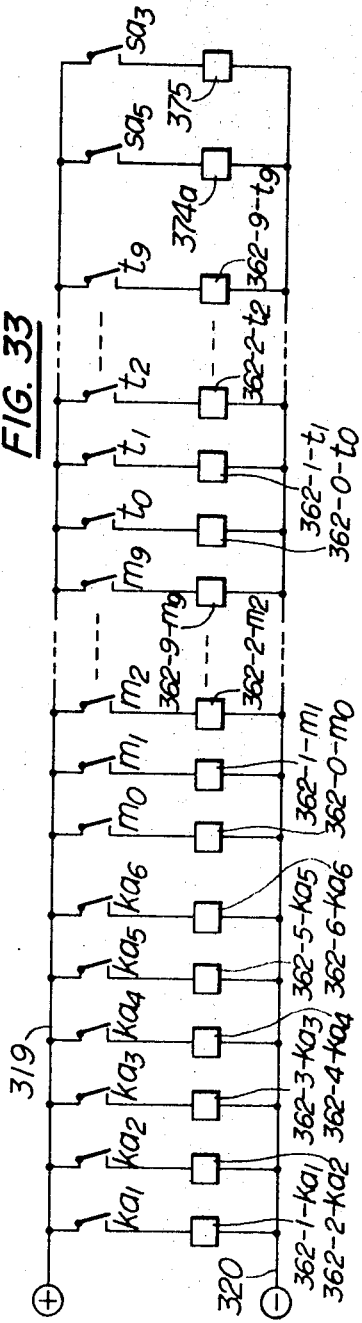
Figure 36:
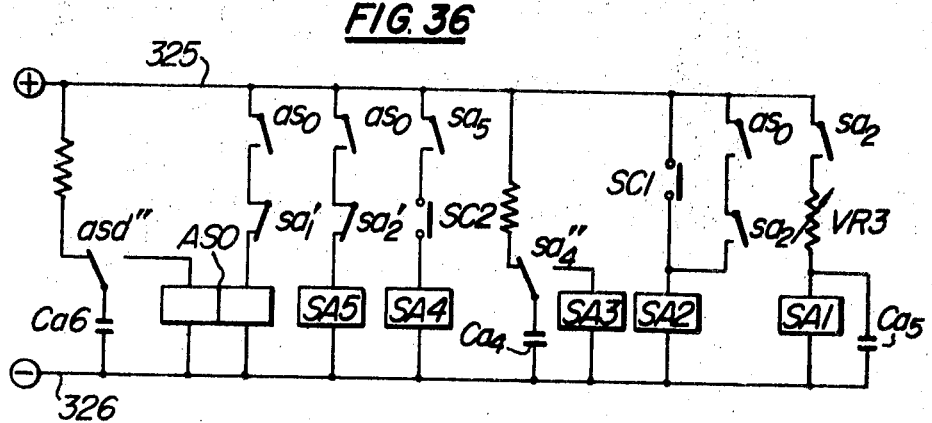
Figure 40:
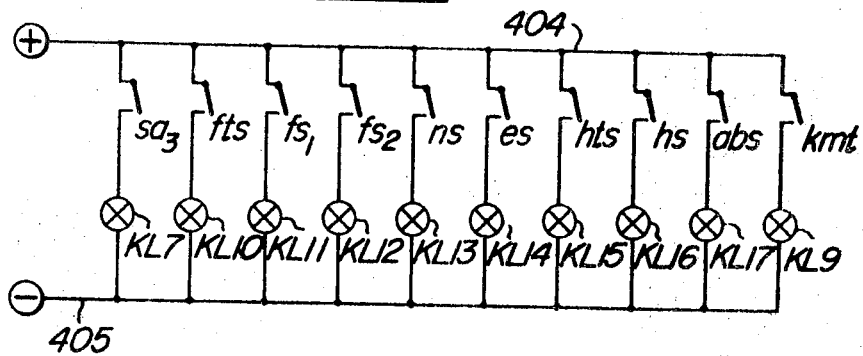
Figure 37:
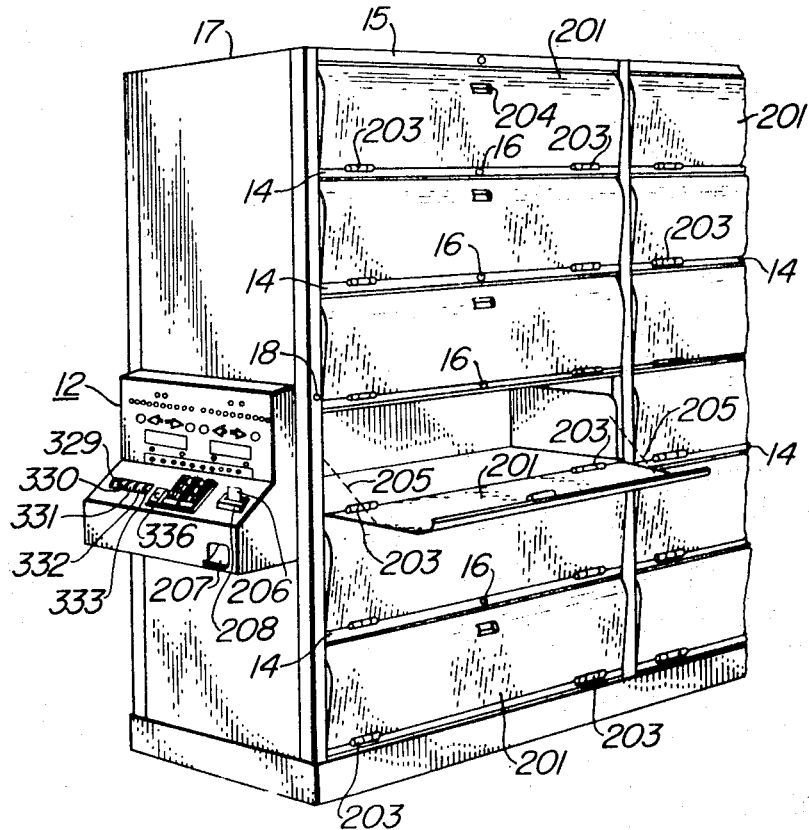
Figure 38:
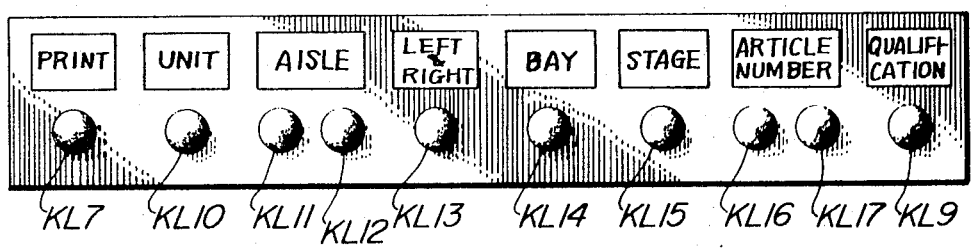
Figure 39:
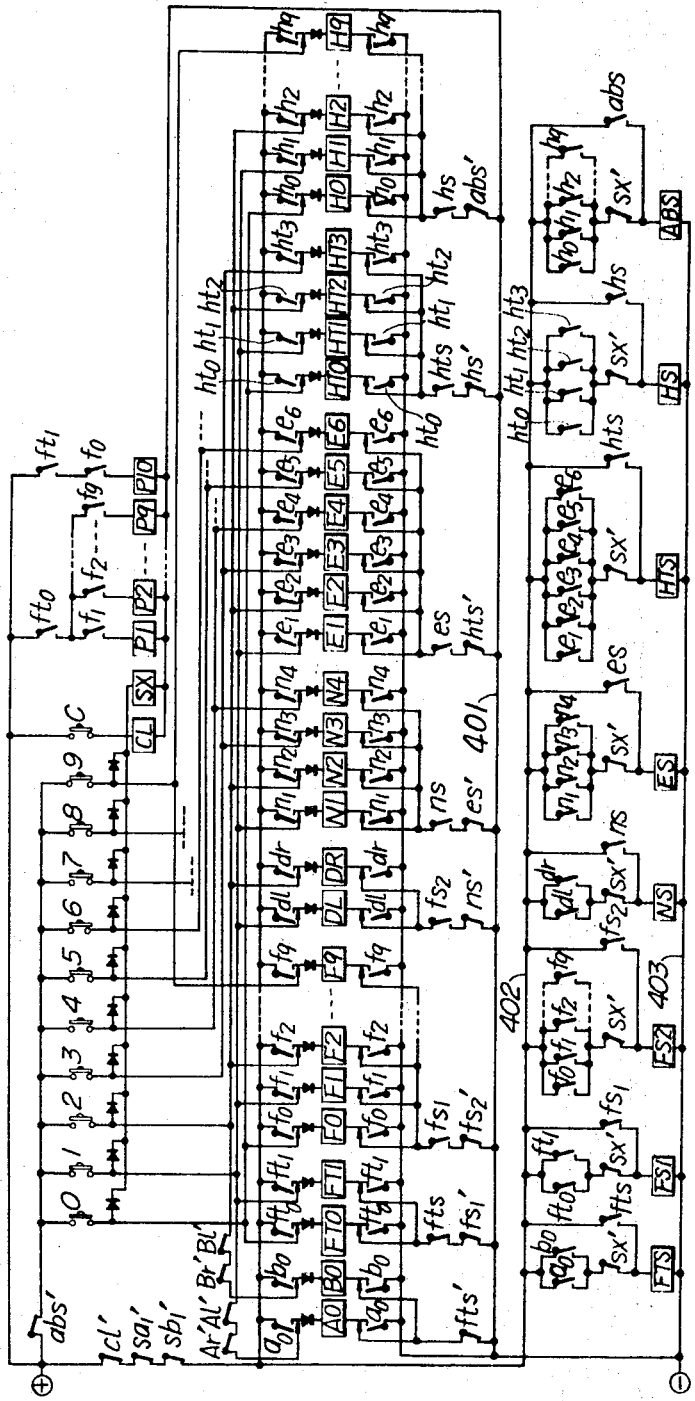

Other objects, features and advantages of the present invention will become apparent from the following detailed description taken in conjunction with the accompanying drawings, in which:

FIGS. 1 and 2 are views showing the arrangement of a shiftable stack assembly comprising two unit assemblies for explaining the present invention, in which FIG. 1 is a plan view and FIG. 2 is a front elevation;

FIGS. 3 to 9 inclusive are views showing an embodiment of the present invention, in which FIG. 3 is a perspective view of a portion of a stack provided with a control panel; FIG. 4 is a diagram of a reading circuit for reading unit, aisle, left or right side of the aisle, bay and the stage recorded on a position card; FIG. 5 is a diagram of a circuit for memorizing a unit A read by the reading circuit of FIG. 4 and starting the shiftable stack assembly for the unit A; FIG. 6 is a diagram of a starting circuit for the unit A for actuating the shiftable stack assembly unit A; FIG. 7 is a diagram of a memorizing circuit for the unit for memorizing left or right side of the aisle, the bay position and the stage position read by the reading circuit of FIG. 4; FIG. 8 is a diagram of a lamp indicating circuit for the first aisle of the unit A for lighting an indicator lamp at the pertinent stage and FIG. 9 is a diagram of a lamp indicating circuit, similar to that shown in FIG. 8, for the second aisle of the unit A;

FIGS. 10 to 12 inclusive are views showing the second embodiment of the present invention in which FIG. 10 is a perspective view of a portion of a stack provided with a control panel; FIG. 11 is a diagram of a signal receiving circuit for receiving signals representing a unit, an aisle, the left or right side of the aisle, a bay position and a stage position upon depressing keys on a keyboard; and FIG. 12 is a diagram of an indicator lamp circuit and a unit memorizing circuit;

FIGS. 13 to 22 inclusive are views showing the third embodiment of the present invention, in which FIG. 13 is a perspective view of a portion of a stack provided with a control panel; FIG. 14 is a cross-sectional view of a portion of a stack; FIG. 15 is a diagram of a shiftable stack assembly starting circuit for the unit A and a separating circuit for separating the left and the right side of an aisle from each other; FIG. 16 is a diagram of a bay and stage position relaying circuit for the unit A; FIG. 17 is a diagram of a starting and qualification signal reading circuit for reading a starting signal and a qualification signal for the unit A; FIG. 18 is a diagram of a starting and qualification signal memorizing circuit for the unit A for memorizing the information read by the reading circuit shown in FIG. 17; FIG. 19 is a diagram of a qualification signal instructing circuit for the unit A for issuing an instruction to the following circuits in response to the memorized qualification signal; FIG. 20 shows diagrams of a qualification setting circuit for the unit A, in which FIG. 20a is a view showing a matrix thereof and FIG. 20b is a view showing a qualification setting element; FIG. 21 shows diagrams of a storage position memorizing circuit for memorizing a storage position in accordance with a storage position information and a qualification information, in which FIG. 21a is a view showing the first aisle of the unit A and FIG. 21b is a view showing the second aisle of the unit A; and FIG. 22 is a diagram of a storage position indicator lamp and unlocking circuit for indicating a pertinent storage position in the first aisle of the unit A and unlocking a closure member for each storage compartment;

FIGS. 23 to 36 inclusive are views showing the fourth embodiment of the present invention, in which FIG. 23 is a perspective view of a portion of a stack provided with a control panel; FIG. 24 is a set of views diagrammatically showing a recording mechanism, in which FIG. 24a is a view showing an arrangement of a printing drum and FIG. 24b is a view showing a printing mechanism; FIG. 25 is a diagram of a circuit for starting the system and receiving unit and aisle numbers; FIG. 26 is a diagram of a circuit for receiving an article number; FIG. 27 is a diagram of an aisle signal forming circuit for forming an aisle signal from the signal received by the aisle number receiving circuit shown in FIG. 25; FIG. 28 is a diagram of an operating relay detecting circuit for detecting faulty operation of the signal receiving relays in the aforesaid respective signal receiving circuits, such as dual receiving of a signal; FIG. 29 is a diagram of a qualification signal receiving circuit for the unit A and a circuit for receiving the number of a qualification card for both units; FIG. 30 is a diagram of a qualification signal memorizing circuit for the unit A for memorizing the qualification signal received by a circuit shown in FIG. 29; FIG. 31 is a diagram of a qualification card number memorizing circuit for memorizing the number of a qualification card received by the circuit shown in FIG. 29; FIG. 32 is a diagram of a circuit of a magnet in the recording mechanism for operating pins associated with unit, aisle, left or right side of the aisle, bay position, stage position and article number respectively; FIG. 33 is a diagram of a magnet circuit for similar operating pins associated with qualification for the unit A and qualification number for both units and a printing hammer; FIG. 34 is a diagram of an operation indicator lamp circuit; FIG. 35 is a diagram of a circuit for verifying the memorization of a qualification signal; and FIG. 36 is a diagram of a circuit for verifying the completion of selection of a storage position; and FIGS. 37 to 40 inclusive are views of the fifth embodiment of the present invention, in which FIG. 37 is a perspective view of a portion of a stack provided with a control panel; FIG. 38 is a view showing an arrangement of operation indicator lamps on the control panel; FIG. 39 is a diagram of a circuit for receiving signals representing a unit, an aisle, left or right side of the aisle, a bay position, a stage position and an article number respectively upon operation of keys on a keyboard; and FIG. 40 is a diagram of an operation indicator lamp circuit on the control panel.

In each embodiment of the invention which will be described hereinafter with reference to the drawings, use is made of a shiftable stack assembly which comprises two unit assemblies, i.e. a unit A consisting of a fixed stack AA, 9 shiftable stacks AB . . . AJ adapted to move on rails 11 and a fixed stack AK provided with a control panel 12, and a unit B consisting of 9 shiftable stacks BB . . . BJ adapted to move on rails 13 and fixed stacks BA and BK, as shown in FIGS. 1 and 2. All of the stacks, excluding the fixed stacks AA and BK, are divided by a longitudinal partition wall so as to form shelves on both sides thereof, and the fixed stack AK–BA is also divided similarly so that the left half of the stack AK as viewed in FIG. 1 may be used as shelves for the unit A and the right half of the stack BA as shelves for the unit B. The aisles formed between adjacent stacks are respectively designated as aisles 1A . . . 10A and 1B . . . 10B, i.e. the aisle formed between the fixed stack AA and the shiftable stack AB is designated as an aisle 1A and the aisle formed between the shiftable stacks AB and AC as an aisle 2A and so on. In the arrangement shown in FIG. 1, the aisles 10A and 10B are formed.

Each stack is divided vertically by 5 shelf boards and longitudinally by 3 partition members so as to form a total of 24 compartments arranged in 4 transverse bays and 6 vertical stages. Each shelf board 14 and a ceiling board 15 are provided with indicator lamps 16 to initiate the positions of the respective compartments, while a front side board 17 facing the aisle is provided with a restoring button 18 for said aisle.

The mechanical structure of the shiftable stack assembly proper and its electrical driving circuit are widely known and will not be described in detail herein. In the following description of the present invention, the same reference numerals as those used in the aforesaid U.S. patent specification No. 3,168,361 are used to indicate the constituent parts of the shiftable stack assembly proper. The shiftable stack assembly described in the aforesaid U.S. patent specification has a fixed stack arranged at the center and shiftable stacks arranged on the left or right side of said fixed stack, whereas the one used in the present invention, which will be described hereinafter, has a fixed stack on one side of the assembly and shiftable stacks provided on the right or left side of said fixed stack. However, it will be readily understood that basically the latter is operated by the circuit described in the said U.S. patent specification. Throughout the embodiments which will be illustrated hereunder, the same constituent parts are indicated by the same reference numerals. Further, small letters designate contacts of relays designated by the corresponding capitals.

In FIGS. 3 to 9, there is shown the first embodiment of the shiftable stack assembly operating system which makes use of a position card having the position of a stored article recorded thereon. Namely, the position card 20 to be inserted into a card receiving slot 19 in a control panel 12, as shown in FIG. 3, is prepared for each article or kind of article stored in the stack assembly. The position card 20 consists of a punch card, a magnetic card, a mark card or the like so that the position of the associated article to be stored can be read by a contact, a photoelectric tube, a magnetic head etc., said position of the article being defined by 5 informations consisting of a unit symbol, either unit A or B, an aisle number, the left or right side of the aisle, a bay number and a stage number.

These informations recorded on the position card 20 are read by a circuit shown in FIG. 4. This reading circuit comprises 5 circuits consisting of a unit reading circuit, an aisle reading circuit, a left or right position reading circuit, a bay position reading circuit and a stage position reading circuit.

Referring to FIG. 4, the unit reading circuit for reading the first information, that is, a unit symbol, either A or B, recorded on the position card, comprises unit reading means UD and unit signal receiving relays A0 and B0, connected between conductors 21 and 22 which are connected to the positive side and negative side of a D.C. power source respectively, said unit reading means UD being composed of a unit A reading element UDA and a unit B reading element UDB which are connected with each other in parallel and adapted to be actuated by a contact, a photoelectric tube or a magnetic head, and said unit signal receiving relays A0 and B0 being connected in series to said unit reading elements respectively and adapted to be actuated upon energization of said respective elements. The aisle reading circuit for reading the second information, i.e. an aisle number, comprises aisle reading means PD having aisle reading elements PD1, PD2 . . . PD10 for 10 aisles connected between the conductors 21 and 22, and aisle receiving relays P1, P2 . . . P10 connected in series to said respective elements so as to be actuated upon energization of said elements. The left or right position reading circuit for reading the third information, i.e. the left or right position in an aisle, comprises left or right position reading means FD having two left position and right position reading elements FDL and FDR which are respectively connected in parallel between the conductors 21 and 22, and left position and right position receiving relays DL and DR connected in series to said respective elements. Similarly, the bay position reading circuit for reading the fourth information or a bay number, comprises bay position reading means ND having 4 reading elements ND1, ND2, ND3 and ND4. and bay position receiving relays N1, N2, N3 and N4 connected in series to said respective elements. Further, the stage position reading circuit for reading the fifth information or the stage position similarly comprises stage position reading means ED having 6 reading elements ED1, ED2 . . . ED6, and stage position receiving relays E1, E2 . . . E6 connected in series to said respective elements.

In FIG. 5 there are shown a unit A memorizing circuit for memorizing the unit read by the reading circuit shown in FIG. 4, and a starting circuit for the unit A for operating the body of the shiftable stack assembly after the unit has been memorized. The unit A memorizing circuit includes a unit A memorizing relay AU and the positive side of said memorizing relay AU is connected to a conductor 23 through a make contact $ao$ of the unit receiving relay AO and through a make contact $au$ of the relay AU, connected between the positive side of the relay AU and said make contact $ao$, and a break contact $rla'$ of a restoring relay RLA for the unit A (which restoring relay RLA is not shown because it is a relay RL provided on the body of the shiftable stack assembly unit A), said conductor 23 being connected to the positive side of the power source. On the other hand, the negative side of the relay AU is connected to a conductor 24 which is connected to the negative side of the power source.

The circuit for starting the shiftable stack assembly comprises a double winding-type starting relay AS0 and a relay AS1 for restoring said starting relay AS0. The positive side of the starting relay AS0 is connected to the conductor 23 through a break contact $as1'$ of a relay AS1 and a make contact $as0$ of said relay AS0, and the positive side of said restoring relay AS1 is also connected to the conductor 23 through a variable resistor VR1 and a make contact $aso$ of the starting relay AS0. The negative sides of these relays AS0 and AS1 are connected to the conductor 24 respectively. The transfer contact $au''$ is a contact of the unit A memorizing relay AU, through which a condenser $Ca1$, connected to the movable contact side of the relay AU, is charged when said relay is in an inoperative position. The discharge current of the condenser $Ca1$ is conducted through the relay AS0 when the relay AU is actuated. A discharging condenser $Ca2$ is connected between the relay AS1 and the variable resistor VR1 at one end and to the conductor 24 at the other end.

The circuit arrangement for the unit B is exactly the same as that of the unit A above described, though not shown in the drawings. It should be understood that in the following description the circuits specified to be for the unit A also include those for the unit B which are identical with the former in arrangement.

FIG. 6 shows a diagram of a starting circuit operatively associated with the shiftable stack assembly unit A and comprising 10 starting relays AA1 . . . AA10 for starting the shiftable stacks in the unit A. The positive side of the shiftable stack starting relay AA1 is connected to a conductor 25 through the make contact $aso$ of the unit A starting relay AS0 and a make contact $p1$ of the aisle receiving relay P1, said conductor 25 being connected to the positive side of the power source. The positive sides of the shiftable stack starting relays AA2 . . . AA10 are connected between the make contacts $aso$ and $p1$ through make contacts $p2$ . . . $p10$ of the aisle receiving relays P2 . . . P10 respectively, while the negative sides thereof are respectively connected to a conductor 26 which in turn is connected to the negative side of the power source.

FIG. 7 is a diagram of memorizing circuits for the unit A for memorizing the left or right position in an aisle, a bay position and a stage position respectively. The circuit for memorizing the left or right position in an aisle comprises a left position memorizing relay DLA and a right position memorizing relay DRA. The positive side of the left position memorizing relay DLA is connected to a conductor 27 through the make contact $aso$ of the unit A starting relay AS0, a make contact $dl$ of a left position receiving relay DL and a reverse-current preventing diode, and through a make contact $dla$ of the relay DLA which is connected between the said diode and the said relay DLA. The conductor 27 is connected to the positive side of the power source through a break contact $rla'$ of a restoring relay (not shown) for the shiftable stack assembly unit A. The positive side of the right position memorizing relay DRA is also connected between the make contacts $aso$ and $dl$ through a make contact $dr$ of the right position receiving relay DR and a reverse-current preventing diode, and to the conductor 27 through the make contact $dra$ of said relay DRA.

The bay position memorizing circuit comprises bay position memorizing relays NA1 . . . NA4, the positive sides of which are connected between the make contacts $aso$ and $dl$ through make contacts $n1$ . . . $n4$ of bay position receiving relays N1 . . . N4 and diodes respectively and to the conductor 27 through make contacts $na1$ . . . $na4$ of the relays NA1 . . . NA4 respectively, which make contacts are respectively connected between said relays and said diodes.

The stage position memorizing circuit comprises stage position receiving relays EA1 . . . EA6, the positive sides of which are connected between the make contacts $aso$ and $dl$ through make contacts $e1$ . . . $e6$ of the stage position receiving relays E1 . . . E6 and diodes respectively and to the conductor 27 through make contacts $ea1$ . . . $ea6$ of the relay EA1 . . . EA6 respectively, which make contacts are respectively connected between the said relays and the said diodes. The negative sides of these memorizing relays are respectively connected to a conductor 28 which in turn is connected to the negative side of the power source.

FIGS. 8 and 9 are diagrams of indicator lamp circuits for the first and the second aisles of the unit A respectively for effecting the indication of a lamp of the respective stages of said aisles. Indicator lamp circuits for the third aisle and onwards are the same as that shown in FIG. 9. The positive side of an indicator lamp 16–L111 which indicates the left side of the first stage of the unit A, first aisle, first bay is connected to a conductor 29 through a reverse-current preventing diode, said conductor 29 being connected to the positive side of the power source through a make contact $cal$ of an aisle illuminating light lighting relay (not shown) and the make contact $dla$ of the aisle left side memorizing relay DLA. The negative side of the indicator lamp 16–L111 is connected to a conductor 31 which is connected to the negative side of the power source through the make contact $eal$ of the stage position memorizing relay EA1 and the make contact $nal$ of the bay position memorizing relay NA1. An indicator lamp 16–R111 for indicating the right side of the first stage has its positive side connected to a conductor 30 through a reverse-current preventing diode, which conductor 30 is connected between the make contacts $cal$ and $dla$ through the make contact $dra$ of the aisle right side memorizing relay DRA, and its negative side connected between the indicator lamp 16–L111 and the make contact $eal$. Likewise, the negative sides of indicator lamps for the left and right sides of the 2nd to the 6th stages of the first bay are respectively connected between the make contact $nal$ and the conductors 29, 30 through the make contacts $ea2 \ldots ea6$ of the respective stage position memorizing relays EA2 ... EA6, and the negative sides of the indicator lamps for the second bay and onwards are respectively connected between the conductors 29, 30 and 31 through the make contacts of the bay position memorizing relays and the make contacts of the stage position memorizing relays. Indicator lamps for the second aisle and onwards, as shown in FIG. 9, have the positive sides thereof connected to a conductor 32 or 33 through a make contact $ca2$ of the aisle illuminating light lighting relay (not shown) for the body of the shiftable stack assembly and the make contacts $dla$ and $dra$ of the aisle left and right side memorizing relays DLA and DRA, and the negative sides to terminals respectively which are indicated by encircled numerals in FIG. 8. With reference to the letter and numerals suffixed to the reference numeral 16, the character L signifies the left side of an aisle, R signifies the right side of an aisle, the first numeral indicates an aisle number, the second numeral indicates a bay number and the third numeral indicates a stage number.

The operation of the shiftable stack assembly operating system constructed as described above will be explained hereunder with reference to the case of inserting into the control panel 12 a position card 20 on which is recorded an information designating the shelf board of the unit A, first aisle, right side, first bay and first stage.

By inserting the position card 20, the unit A reading element UDA, the first aisle reading element PD1, the right position reading element FDR, the first bay position reading element ND1 and the first stage position reading element ED1, shown in FIG. 4, are energized to actuate the unit A receiving relay AO, the first aisle receiving relay P1, the right position receiving relay DR, the first bay position receiving relay N1 and the first stage position receiving relay E1 which are connected in series to the said reading elements respectively.

Upon receiving a signal representative of the unit A, the make contact $ao$ shown in FIG. 5 is closed to actuate the unit A repeating relay AU. The make contact $au$ of the relay AU is closed on actuation of said relay and thus the relay AU is operated to self-hold. By this operation of the relay AU, its transfer contact $au''$ is shifted to a side opposite to that shown and the current stored in the condenser $Ca1$ flows through the starting relay AS0, actuating the same, so that the make contact $aso$ is closed and thus the relay is also operated self-hold. In this case, the restoring relay AS1 is actuated by the actuation of the relay AS0 but not immediately because of the presence of the condenser $Ca2$. Namely, the restoring relay AS1 is not actuated before the condenser $Ca2$ is charged but is actuated only after completing the charging of the condenser $Ca2$, whereupon the brake contact $as1$ is opened and the unit A starting relay AS0 is restored. Thus, there is a certain period before the restoring relay AS1 is actuated and the shiftable stack assembly unit A starts its operation within the said delay period, with the relays for memorizing the aisle left or right position, bay position and stage position, indicating a desired stage, being self-held. Upon actuation of the relays AS0 and P1, their make contacts $aso$ and $p1$ are closed, actuating the shiftable stack starting relay AA1 shown in FIG. 6. Therefore, the driving circuit for the body of the shiftable stack assembly is actuated to move the shiftable stack assembly and to form the first aisle.

By the actuation of the relays AS0 and DR, the aisle right position memorizing relay DRA shown in FIG. 7 is actuated to close its make contact $dra$ and thus the relay DRA is operated to self-hold. Similarly, by the actuation of the relays N1 and E1, the bay position memorizing relay NA1 and the stage position memorizing relay EA1 are actuated, so that their make contacts $na1$ and $ea1$ are closed and these relays are operated to self-hold. At the point when the restoring relay AS1 is actuated, the break contact $as1'$, shown in FIG. 5, of said relay is opened, so that the receiving relays and the operation memorizing relay are released from the self-hold state, preparing for receiving the following information relative to the unit B.

Therefore, the make contacts $cal$, $dra$, $na1$ and $ea1$, shown in FIG. 8, are closed and the indicator lamp 16–R111 is turned on. Upon completion of the operation, the restoring button 18 at the aisle entrance is pushed, whereupon the restoring relay RLA (not shown) for the body of the shiftable stack assembly is actuated and the break contact $rla'$ shown in FIGS. 5 and 7 is opened, whereby the self-held relays are restored and the present system and the shiftable stack assembly are returned to their original positions.

As will be understood from the foregoing description, according to this embodiment, the stacks are moved and a desired location is indicated completely automatically by inserting into the card receiving slot 19 in the control panel 12 a position card 20 on which the said desired location is recorded. Furthermore, during operation of the shiftable stack assembly the operating state of the assembly is indicated by a lamp on the control panel, similar to the conventional shiftable stack assemby. Therefore, even if another information relative to the unit A is fed into the system by another person, the system will not operate by virtue of the break contact $rla'$. However, an information relative to the unit B may be fed into the system to operate the shiftable stack assembly unit B, simultaneously with the shiftable stack assembly unit A, because the unit B is not in use in this case.

FIGS. 10 to 12 inclusive show the second embodiment of the present invention which is so designed that a desired aisle is opened and a desired storage position is indicated by a lamp or the like automatically to facilitate storing or taking out of an article, by depressing a set of keys from 0 to 9 in accordance with a code number representing the storage position of each kind of articles or each article stored.

Therefore, according to this embodiment, a keyboard 102 comprising a set of numerical keys from 0 to 9 and a clear key C is provided on a table 101 extending forwardly from the lower portion of the control panel 12, as shown in FIG. 10. Also provided on the control panel 12 are a unit operation indicator lamp KL1, aisle operation indicator lamps KL2 and KL3, an aisle left or right operation indicator lamp KL4, a bay position operation indicator lamp KL5 and a stage position operation indicator lamp KL6.

Now, an electrical system for starting the shiftable stack assembly, opening an aisle associated with a desired storage position and indicating a desired stage of a stack upon depressing the keys of the keyboard 102 on the control panel 12, will be explained hereunder.

First of all, an arrangement is made such that the unit A is represented by key 1, the unit B by key 2, the left side of an aisle by key 1, the right side of an aisle by key 2, the first aisle by keys 0, 1, the second aisle by keys 0, 2 . . . the tenth aisle by keys 1, 0, and bays and stages by keys with the same numerals as the numbers of the respective bays and stages.

The circuit diagram shown in FIG. 11 comprises a circuit for receiving signals representative of unit, aisle left and right, bay and stage positions; an operation verifying circuit for setting a unit, aisle, etc. in accordance with signals successively supplied as the keys are operated; and an aisle signal forming circuit for forming a series of aisle signals by combining two aisle signals.

The receiving circuit comprises the numerical keys 0 to 9, the clear key C, and unit receiving relays A0 and B0, aisle first receiving relays FT0 and FT1, aisle second receiving relays F0 to F9, aisle left or right receiving relays DL and DR, bay position receiving relays N1 to N4 and stage position receiving relays E1 to E6, each of which has a make-before-break contact on the positive and negative sides thereof. The key 0 is connected between a conductor 103 and make-before-break contact sides of the respective make-before-break contacts $ft_0$ and $f_0$ above the aisle first receiving relay FT0 and the aisle second receiving relay F0, said conductor 103 being connected to the positive side of a D.C. current power source through a break contact $hts'$ of a stage position operation verifying relay HTS to be described later. The key 1 is connected between the conductor 103 and the break contact sides of respective upper make-before-break contacts $ao$, $ft1$, $f1$ $dl$, $n1$ and $e1$ through break contacts $Ar'$ and $Al'$ of a discriminating relay (not shown) for the shiftable stack assembly unit A, said make-before-break contacts being respectively located above the unit receiving relay A0 indicating the unit A, the aisle first signal receiving relay FT1 to indicate the order of ten's of aisle number being "1," the aisle second signal receiving relay F1 to indicate the order of ones of aisle number being "1," the aisle left side signal receiving relay DL to indicate the left side of an aisle, the bay position signal receiving relay N1 to indicate the first bay position and the stage position signal receiving relay E1 to indicate the first stage position. Likewise, the key 2 is connected between the break contact sides of respective upper make-before-break contacts $bo$, $f2$, $dr$, $n2$ and $e2$, and the conductor 103, through break contacts $Br'$ and $Bl'$ of a discriminating relay (not shown) for the shiftable stack assembly unit B, the make-before-break contacts being respectively located above a unit signal receiving relay B0 to indicate the unit B, an aisle second signal receiving relay F2 to indicate the order of ones of aisle number being "2," an aisle right side signal receiving relay DR to indicate the right side of an aisle, a bay position signal receiving relay N2 to indicate the second bay position and a stage position signal receiving relay N2 to indicate the second stage position. The keys 3 and 4 are connected between the break contact sides of respective upper make-before-break contacts $f3$, $f4$, $n3$, $n4$, $e3$ and $e4$ and the conductor 103, which made-before-break contacts being respectively located above aisle second signal receiving relays F3 and F4 to indicate the order of ones of aisle numbers being "3" and "4" and stage position signal receiving relays E3 and E4 to indicate the 3rd and 4th stage positions; the keys 5 and 6 between the break contact sides of respective upper make-before-break contacts $f5$ and $f6$, and the conductor 103, said make-before-break contacts being respectively located above aisle second signal receiving relays F5 and F6 to indicate the order of ones of aisle numbers being "5" and "6" and stage position signal receiving relays E5 and E6 to indicate the 5th and 6th stage positions; and keys 7, 8 and 9 between the break contact sides of respective upper make-before-break contacts $f7$, $f8$ and $f9$ and the conductor 103, the make-before-break contacts being respectively located above aisle second signal receiving relays F7, F8 and F9 to indicate the order of ones of aisle numbers being "7," "8" and "9." The make contact sides of these upper make-before-break contacts are respectively connected to the positive side of the power source through the break contact $as1'$ of the restoring relay AS1 and a break contact $cl'$ of a relay CL for receiving a signal from the clear key C. The break contact sides of the lower make-before-break contacts $ao$ and $bo$ of the unit signal receiving relay A0 and B0 are respectively connected to a conductor 104 through a break contacts $fts'$ a unit operation verifying relay FTS to be described later; the break contact sides of the lower make-before-break contacts $ft_0$ and $ft1$ of the aisle first signal receiving relays FT0 and FT1 are connected to the conductor 104 through a make contact $fts$ of a unit operation verifying relay FTS and a break contact $fs1'$ of an aisle first operation verifying relay FS1 to be described later; and the break contact sides of the lower make-before-break contacts $f1$ to $f9$ of the aisle second signal receiving relays F0 to F9 are connected to the conductor 104 through a make contact $fs1$ of an aisle first operation verifying relay FS1 and a break contact $fs2'$ of an aisle second operation verifying relay FS2 to be described later, the conductor 104 being connected to the negative side of the power source. Similarly, the break contact sides of the lower make-before-break contacts $dl$ and $dr$ of the aisle left and right signal receiving relays DL and DR are connected to the conductor 104 through the make contact $fs2$ of the aisle second operation verifying relay FS2 and a break contact $ns'$ of an aisle left or right operation verifying relay NS to be described later; the break contact sides of the lower make-before-break contacts $n1$ to $n4$ of the bay position signal receiving relays N1 to N4 are connected to the conductor 104 through the make contact $ns$ of the aisle left or right operation verifying relay NS and a break contact $es'$ of a bay position operation verifying relay ES to be described later; and the break contact sides of the lower make-before-break contacts $e1$ to $e6$ of the stage position signal receiving relays E1 to E6 are connected to the conductor 104 through the make contact $es$ of the bay position operation verifying relay ES and a break contact $hts'$ of a stage position operation verifying relay HTS to be described later. The make contact sides of these lower make-before-break contacts are connected to the negative side of the power source. As will be understood from the foregoing description of the circuit, the key 0 represents that the order of tens of an aisle number is "0" and that the order of ones of an aisle number is "0." The key 1 means six factors, i.e. the unit A, the order of tens of an aisle number being "1," the order of ones of an aisle number being "1," the left side of an aisle, the first bay and the first stage. Similarly, the key 2 means five factors, i.e. the unit B, the order of ones of aisle number being "2," the right side of aisle, the second bay position and the second stage position. The keys 3 and 4 respectively mean three factors, i.e. the order of ones of aisle number being "3" and "4," the 3rd and 4th bay positions and the 3rd and the 4th stage positions. The keys 5 and 6 respectively mean two factors, i.e. the order of ones of an aisle number being "5" and "6" and the 5th and 6th stage positions. The remaining keys 7, 8 and 9 respectively mean the order of ones of an aisle number being "7," "8" and "9."

The operation verifying circuit verifies and sets the respective operations in sequence in accordance with signals successively supplied by the operation of the keys, namely it verifies a unit by the first signal, and aisle by the second and third signals and the left or right side of the aisle by the fourth signal, and so on. Therefore, the operation verifying circuit includes 6 relays, that is, the unit operation verifying relay FTS for verifying a unit being operated by the first operation of the keys, the aisle first operation verifying relay FS1 for verifying the order of tens of an aisle number being operated by the second operation of the keys, the aisle second operation verifying relay FS2 for verifying the order of ones of an aisle number being operated by the third operation of the keys, the aisle left or right operation verifying relay NS for verifying the left or right side of the aisle being operated by the fourth operation of the keys, the bay position operation verifying relay ES for verifying a bay position being operated by the fifth operation of the keys and the stage position operation verifying relay HTS for verifying a stage position being operated by the sixth operation of the keys. The positive side of the unit operation verifying relay FTS is connected to a conductor 105 through a break contact sx' of an erroneous operation preventing relay SX to be described later, and the make contact ao of the unit A signal receiving relay A0 and the make contact bo of the unit B signal receiving relay B0, which make contacts are connected with each other in parallel, said conductor 105 being connected to the positive side of the power source through the break contacts as1', bs1' and cl'. The make contact fts of the relay FTS is connected between said relay and the break contact sx' at one terminal and to the conductor 105 at the other terminal. The positive side of the aisle first operation verifying relay FS1 is connected to the conductor 105 through the break contact sx' of the erroneous operation preventing relay SX, and the make contact fto of the aisle first signal receiving relay FT0 to indicate the order of tens of an aisle number being "0" and the make contact ft1 of the aisle first signal receiving relay FT1 to indicate the order of ones of an aisle number being "1," said make contacts fto and ft1 being connected to the conductor 105 in parallel to each other, and the make contact fs1 of the relay FS1 is connected between said relay and the break contact sx' at one terminal and to the conductor 105 at the other terminal. The positive side of the aisle second operation verifying relay FS2 is connected to the conductor 105 through the break contact sx' of the erroneous operation preventing relay SX and the make contacts f0 to f9 of the respective aisle second signal receiving relays F0 to F9 to indicate the order of ones of an aisle number, the make contacts f0 to f9 being connected to the conductor 105 in parallel to each other, and the make contact fs2 of the relay FS2 is connected between said relay and the break contact sx' at one terminal and to the conductor 105 at the other terminal. The positive side of the aisle left or right operation verifying relay NS is connected to the conductor 105 through the break contact sx' of the erroneous operation preventing relay SX, and the make contact dl of the aisle left side signal receiving relay DL and the make contact dr of the aisle right side signal receiving relay DR, which make contacts dl and dr are connected to the conductor 105 in parallel to each other, and the make contact ns of the relay NS is connected between said relay and the break contact sx' at one terminal and to the conductor 105 at the other terminal. The positive side of the bay position operation verifying relay ES is connected to the conductor 105 through the break contact sx' of the erroneous operation preventing relay SX and the make contacts n1 to n4 of the bay position signal receiving relays N1 to N4 which make contacts n1 to n4 are connected to the conductor 105 in parallel to each other, and the make contact es of the relay ES is connected between the relay and the break contact sx' at one terminal and to the conductor 105 at the other terminal. Finally, the positive side of the stage position operation verifying relay HTS is connected to the conductor 105 through the break contact sx' of the erroneous operation preventing relay SX and the make contacts e1 to e6 of the stage position signal receiving relays E1 to E6, which make contacts e1 to e6 are connected to the conductor 105 in parallel to each other, and the make contact hts of the relay HTS is connected between said relay and the break contact sx' at one terminal and to the conductor 105 at the other terminal. The negative sides of these relays are respectively connected to a conductor 106 which is connected to the negative side of the power source.

The aisle signal forming circuit has aisle signal forming relays P1 to P10 for the 10 aisles. The positive side of the aisle signal forming relay P1 is connected to a conductor 107 through the make contact fto of the aisle first signal receiving relay FT0 and the make contact f1 of the aisle second signal receiving relay F1, said conductor 107 being connected to the positive side of the power source. The aisle signal forming relays P2 to P9 are respectively connected between the make contacts ft0 and f1 through the respective make contacts f2 to f9 of the aisle second signal receiving relays F2 to F9 at one terminal. The positive side of the aisle signal forming relay P10 is connected to the conductor 107 through the make contact ft1 of the aisle first signal receiving relay FT1 and the make contact fo of the aisle second signal receiving relay F0. The negative sides of these relays P1 to P10 are connected to the conductor 104 which is connected to the negative side of the power source. The erroneous operation preventing relay SX operates during the period when the key is depressed, preventing dual receiving of signal. The clear signal receiving relay CL is actuated by depressing the clear key C for resetting all the keys when the key operation is erroneous.

The indicator lamp circuit, shown in FIG. 12, on the control panel comprises the unit operation indicator lamp KL1, the aisle operation indicator lamps KL2 and KL3, the aisle left or right operation indicator lamp KL4, the bay position operation indicator lamp KL5 and the stage position operation indicator lamp KL6. These indicator lamps KL1 to KL6 are respectively connected at one terminal to a conductor 108 through the make contacts fts, fs1, fs2, ns, es and hts of the operation verifying relays shown in FIG. 11 respectively, and at the other terminal to a conductor 109.

The unit A memorizing circuit, as shown in FIG. 12, has the unit A memorizing relay AU but is exactly the same as the unit A memorizing circuit in the preceding embodiment, shown in FIG. 5, except that the make contact hts of the stage position operation verifying relay HTS is connected across the conductor 108 and the make contact ao of the unit signal receiving relay a0.

For operating the shiftable stack assembly after the unit has been memorized by the circuit of FIG. 12, the unit A starting circuit, the shiftable stack assembly unit A starting circuit, the memorizing circuits for memorizing the left or right side of an aisle, bay position and stage position, and the indicator lamp circuit in the preceding embodiment, shown in FIGS. 5 to 9, are used as such.

Next, the operation of designating a storage position of the unit A, first aisle, right side, first bay and first stage, will be explained hereunder: In this case, the keys are operated six times in the order "1," "0," "1," "2," "1" and "1." At first the key "1" is depressed, whereupon a current flows from the positive side of the power source through the break contact hts', the conductor 103, the key 1 and the diode to the erroneous operation preventing relay SX to actuate the same, and also the unit signal receiving relay A0 is actuated. In this case, the relays other than the unit signal receiving relay A0, i.e. the aisle first signal receiving relay FT1, the aisle second signal receiving relay F1, the aisle left side signal receiving relay DL, the bay position signal receiving relay N1 and the stage position signal receiving relay E1, are not actuated because, while the relay A0 is connected with the said relays through the break contacts Ar' and Al' of the unit A discriminating relay, the break contact side of the upper make-before-break contact *ao* and the upper make-before-break contacts *ft*1, *f*1, *dl*, *n*1 and *e*1 of said relays, the break contact side of the lower make-before-break contacts *fts*, *fs*1, *fs*2, *ns* and *es* of said relays are not connected to the negative side of the power source and therefore closed circuits are not formed as these lower make-before-break contacts are open. The unit signal receiving relay A0 is actuated because the break contact side of its lower make-before-break contact *ao* is connected to the negative side of the power source through the break contact *fts'*, forming a closed circuit. Upon actuation of the relay A0, the make contacts of the upper and lower make-before-break contacts *ao* are closed and the break contacts of the same are opened, whereby the relay *a0* is self-held. The erroneous operation preventing relay SX is held actuated, with its break contact *sx'* opened, throughout the period when the key is depressed. When the depressed key is released, the key is returned to the original position and accordingly the relay SX is returned to its original position and its break contact *sx'* is closed. Upon actuation of the relay A0, the make contact *ao* in the operation verifying circuit is closed, whereby the unit operation verifying relay FTS is actuated and its make contact *fts* is closed, allowing said relay to self-hold. Thus, it will be understood that the unit is memorized by the first key operation.

Next, the keys 0 and 1 are depressed. Upon depressing the key 0, the power source is connected to the aisle first signal receiving relay FTO and the aisle second signal receiving relay FO through the conductor 103 and the break contact sides of the upper make-before-break contacts *fto* and *fo* of said relays. However, since the break contact side of the lower make-before-break contact of the relay FO is not connected to the negative side of the power source as the make contact *fs*1 is open, said relay FO is not actuated. On the other hand, the relay FT0 is actuated because the make contact *fts* is closed by the self-hold unit operation verifying relay FTS and the break contact side of the make-before-break contact *fto* of said relay FTO is connected to the negative side of the power source through said contact *fts* and the break contact *fs*1', forming a closed circuit. Therefore, the relay FTO is self-held, with the make contacts of the upper and lower make-before-break contacts *ft0* closed and the break contacts of the same opened. The aisle first operation verifying relay FS1 is also actuated by the closure of the make contact *fto* and self-held with its make contact *fs*1 closed. Then, the key 1 is depressed, whereupon the positive side of the power source is connected to the aisle first signal receiving relay FT1, the aisle second signal receiving relay F1, the aisle left side signal receiving relay DL, the bay position signal receiving relay N1 and the stage position signal receiving relay E1 through the conductor 103 since the unit signal receiving relay A0 has already been actuated with the break contact side of its make-before-break contact *ao* opened. However, since the aisle first operation verifying relay FS1 is self-held with its break contact *fs*1' opened and further the make contacts *fs*2, *ns* and *es* are opened, the relay F1 only is connected to the negative side of the power source, forming a closed circuit, and thus said relay F1 is operated to self-hold. By the actuation of this relay F1, the aisle second operation verifying relay FS2 is also actuated and self-held. Next, the key 2 is depressed to designate the right side of an aisle, whereupon the power source is connected to the unit signal receiving relay B0 through the conductor 103, the break contacts Br' and Bl' of the unit B discriminating relay of the shiftable stack assembly and the break contact side of the upper make-before-break contact *bo* of said relay, and to the aisle second signal receiving relay F2, the aisle right side signal receiving relay DR, the bay position signal receiving relay N2 and the stage position signal receiving relay E2 through the break contact sides of the upper make-before-break contacts *bo*, *f*2, *dr*, *n*2 and *e*2 of the respective relays. In this case, however, the break contacts *fts'* and *fs*2' are opened and the make contacts *ns* and *es* are also opened. Therefore, operating circuits for the relays other than the relay DR are not formed, but for the relay DR an operating circuit is formed comprising the break contact side of the lower make-before-break contact *dr* of said relay, the make contact *fs*2 of the self-held relay FS2 and the break contact *ns'*, whereby said relay DR is actuated and self-held. Upon closure of the make contact *dr*, the aisle left or right operation verifying relay NS is also actuated and self-held. Then, the key 1 is depressed to designate the first bay. In this case, the unit signal receiving relay A0 and the aisle second signal receiving relay F1 are not actuated because they are self-held with the break contact sides of their upper make-before-break contacts *ao* and *f*1 opened; the aisle first signal receiving relay FT1 and the aisle left or right side signal receiving relay DL are not actuated because their break contacts *fs*1' and *ns'* are opened; and the stage position signal receiving relay E1 is not actuated because its make contact *es* is opened, the bay position signal receiving relay N1 only being actuated and self-held with its make contact *n*1 closed. Therefore, the bay position operation verifying relay ES is actuated and self-held. Finally, the key 1 is depressed to designate the first stage, whereupon the stage position signal receiving relay E1 only is actuated and self-held under conditions similar to those mentioned above, with its make contact *e*1 closed. Thus, the stage position operation verifying relay HTS is also self-held. The actuation of the stage position verifying relay HTS causes the break contact *hts'* to open which is connected between the positive side of the power source and the conductor 103, so that this circuit will not perform a new operation even if the keys are operated thereafter. On the other hand, the make contacts *ft0* and *f*1 are closed upon actuation of the aisle first signal receiving relay FT0 and the aisle second signal receiving relay F1, to actuate the aisle signal forming relay P1. Further, by the actuation of the operation verifying relays, their make contacts *fts*, *fs*1, *fs*2, *ns*, *es* and *hts* are closed, whereby the indicator lamps KL1 to KL6 on the control panel 12, shown in FIG. 10, are turned on indicating the state of key operation.

The make contacts *hts* and *ao*, shown in FIG. 12, of the stage position operation verifying relay HTS and the unit signal receiving relay A0 respectively are closed on actuation of said respective relays. Therefore, the unit A memorizing relay AU is actuated and self-held with its make contact *au* closed.

Thereafter, the shiftable stack assembly is placed in operation to open the first aisle and a desired stage is indicated by a lamp by the functions of the circuits shown in FIGS. 5 to 9 of the first embodiment.

According to the second embodiment of the invention as described above, the shiftable stack assembly starts to move automatically to open an aisle associated with a desired stage and the desired stage is indicated by a lamp by depressing a set of numerical keys from 0 to 9 in sequence according to a code number which is designated for each kind of article or each article stored in the stack assembly and the individual numerals of which represent unit, aisle, the left or right side of the aisle, bay position and stage position respectively.

In FIGS. 13 and 22 inclusive, there is shown the third embodiment of the invention which is so designed that not all persons can take every article in and out of the stack assembly. Namely, in operating the shiftable stack assembly operating system of this embodiment, use is made of qualification cards in addition to the position cards, as used in the first embodiment, with the storage positions of the individual articles stored recorded thereon, said qualification card consisting of a punch card, a mark card, a magnetic card or the like and having recorded thereon a qualification signal representing the qualification of each attendant, that is, a specific portion of the stack assembly for which said attendant is qualified to store articles and to take articles out, and an aisle is formed only when a signal representative of position information is admitted by a signal representative of qualification information.

Furthermore, according to this embodiment each stage is provided with a lockable closure member so that articles stored cannot be stored or taken out unless the present operating system is operated.

FIG. 13 shows a portion of the stack assembly according to this embodiment. As shown, each storage compartment is provided with a closure member 201 which is openably connected to a shelf board 14 or a bottom plate 202 at its lower edge by means of hinges 203. Numeral 204 designates a handle and 205 designates chains to support the closure member in an open position. As seen, the closure member bulges outwardly from the front face of the shelf board when it is closed and its free edge portion is curved upwardly. Therefore, even if the attendant operates the restoring button 18 to form another aisle before closing the closure member, the closure member is automatically closed by sliding engagement with the front surface of the confronting closure member of the adjacent shiftable stack, whereby breakage of the closure member can be prevented.

The control panel 12 is provided, in addition to the position card receiving slot 19 explained in the first embodiment, with a qualification card receiving slot 208 which is in communication with a card discharge opening 207 provided therebelow so that the qualification card 206 inserted into the receiving slot 208 is automatically discharged from said discharge opening 207.

A mechanism for locking the closure member 201 will be described with reference to FIG. 14. The top edge of the closure member 201 which is curved in such a manner that its upper portion slightly bulges outwardly when closed, is flexed so as to extend vertically downwardly in the associated storage compartment in a closed position to form a latch mounting portion 209, and a latch 210 having a notch formed in the upper side thereof is mounted to said portion 209. A locking bar 211 is provided for locking engagement at one end with the notch of the latch. The other end of the hook-shaped locking bar 211 is pivotally mounted on a pivot pin 212. The locking bar 211 is held in position by suitable means (not shown) so that it will not depend unnecessarily downwardly when released from engagement with the latch 210. A magnet 213 is provided on the underside of each of the shelf boards 14 and the upper board 15 in such a manner to be suitably spaced above the central portion of the associated locking bar 211. It will, therefore, be seen that when the magnet 213 is energized, the locking bar 211 is attracted by said magnet and disengaged from the latch 210, providing for opening of the closure member 201. The information on the position card is read by reading circuit, shown in FIG. 4, of the first embodiment. However, according to this embodiment the stack assembly operatnig system will not be operated unless the qualification card is inserted as will be described later. For this purpose, a make contact $s1$ of a starting signal memorizing relay S1 to be described later is provided between the conductor 21 connected to the power source and the positive side of the unit reading means in FIG. 4, though not apparent in the drawings.

A circuit shown in FIG. 15 comprises a shiftable stack starting circuit and a left and right separating circuit. The unit repeating circuit is composed of a unit signal repeating relay AU. The said unit signal repeating relay AU is connected in series with the make contact $ao$ of the unit signal receiving relay A0 which make contact $ao$ is connected across conductors 214 and 215, the said conductor 214 is connected to the positive side of the D.C. power source through the break contacts $Ar''$ and $Al,'$ of the unit A discriminating relay (not shown) for the shiftable stack assembly, and the said conductor 215 is connected to the negative side of the power source.

The shiftable stack starting circuit is composed of the make contact $aso$ of the shiftable stack assembly starting relay AS0 connected to the conductor 214', which is connected to the conductor 214 through the make contact $au$ of the unit signal repeating relay AU, a make contact $p1$ of the aisle signal receiving relay P1 connected in series to said make contact $aso$, a starting relay AA1 for starting an aisle selecting circuit in the main circuit of the shiftable stack assembly and connected to the conductor 215, make contacts $p2, p3 \ldots p10$ of the aisle signal receiving relays P2, P3 ... P10, which make contacts are connected between the make contacts $aso$ and $p1$ in parallel to each other, and the starting relays AA2, AA3 ... AA10 connected in series to said respective make contacts at one terminal and to the conductor 215 at the other terminal. The left and right separating circuit is composed of the make contact $dl$ of the relay for receiving a signal representative of the left or right position of a selected aisle of the shiftable stack assembly, left aisle separating relays LA1, LA2 ... LA10 which are connected in parallel across a conductor 214" connected to the conductor 214' through the make contact $dl$ and the conductor 215, the make contacts $p1, p2 \ldots p10$ of the aisle signal receiving relays P1, P2 ... P10 connected in series between the make contact $dl$ and the respective relays LA1, LA2 ... LA10, the make contact $dr$ of the relay for receiving a signal representative of the right position of a selected aisle of the shiftable stack assembly, right aisle separating relays RA1, RA2 ... RA10 connected in parallel across a conductor 214''', connected to the conductor 214" at a point forwardly of said make contact $dl$ through said make contact $dr$, and the conductor 215, and the make contacts $p1, p2 \ldots p10$ of the aisle signal receiving relays P1, P2 ... P10 connected in series between the make contact $dr$ and the respective relays RA1, RA2 ... RA10.

The unit A bay position and stage position signal repeating circuit shown in FIG. 16 is composed of the make contact $au$ of the unit A signal repeating relay AU connected to a conductor 216 which is connected to the positive side of the D.C. power source, the make contact $n1$ of the bay position signal receiving relay N1 connected in series to the make contact $au$, the bay position signal repeating relay NA1 connected in series to the make contact $n1$ at one terminal and to conductor 217 at the other terminal which conductor 217 is connected to the negative side of the power source, the bay position signal repeating relays NA2, NA3 and NA4 and the state position signal repeating relays EA1, EA2 ... EA6 which are connected in parallel between the make contacts $au$ and $n1$ through the make contacts $n2, n3$ and $n4$ of the bay position receiving relays N2, N3 and N4 and the make contact $e1, e2 \ldots e6$ of the stage position signal receiving relays E1, E2 ... E6 respectively.

A starting and qualification signal reading circuit shown in FIG. 17 is one for the unit A which is adapted to be operated by the insertion of the qualification card 206 into the qualification card receiving slot 208 shown in FIG. 13. This circuit is composed of reading means KD consisting of a starting signal reading element KD1 and a completion signal reading element KD2 connected in parallel to said starting signal reading element, both of the said elements being adapted to be operated by a contact, a photoelectric tube or a magnetic head, a starting signal reading circuit consisting of starting and completion signal receiving relays KS1 and KS2 which are connected in series to the said respective elements so as to be operated upon energization of the said elements, unit A qualification signal reading means AD having four unit A qualification signal reading elements AD1, AD2, AD3 and AD4 arranged in parallel relation and a unit A qualification signal reading circuit consisting of qualification signal receiving relays AK1, AK2, AK3 and AK4 respectively connected in series to said unit A qualification signal reading elements, all of said elements and relays being connected between conductors 218 ad 219 connected to the positive and negative side of the D.C. power source respectively.

In FIG. 18, there is shown a starting signal memorizing circuit and a qualification signal memorizing circuit of the unit A. The starting signal memorizing circuit includes a starting signal memorizing relay S1 and a completion signal repeating relay S2. The starting signal memorizing relay S1 is connected at one terminal to a conductor 220 through a make contact $ks1$ of a starting signal receiving relay KS1, the said conductor being connected to the positive side of the power source, and at the other terminal to a conductor 221 which is connected to the negative side of the power source. A make contact $s1$ of the relay S1 is connected at one terminal between the said relay S1 and the make contact $ks1$ and at the other terminal to a conductor 220' which is connected to the conductor 220 through a break contact $s2'$ of the completion signal repeating relay S2. The completion signal repeating relay S2 is connected at one terminal to the conductor 220 through a make contact $ks2$ of the completion signal receiving relay KS2 and at the other terminal to the conductor 221.

The unit A qualification signal memorizing circuit has four unit A qualification signal memorizng relays AS1, AS2, AS3 and AS4, each of which has the positive side connected to the conductors 220 and 220' through make contacts $ak1$ and $as1$, $ak2$ and $as2$, $ak3$ and $as3$ or $ak4$ and $as4$, and the negative side to the conductor 221. For example, the positive side of the unit A first qualification signal memorizing relay AS1 is connected to the conductor 220 through the make contact $ak1$ of the unit A qualification signal receiving relay AK1 and to the conductor 220' through the make contact $as1$ of said relay AS1 which make contact is connected between the make contact $ak1$ and the relay AS1, while the negative side thereof is connected to the conductor 221.

FIG. 19 shows a unit A qualification signal instructing circuit comprising six qualification signal instructing relays KA1, KA2 . . . KA6. The positive side of the first qualification signal instructing relay KA1 is connected to a conductor 222 through the make contact $as1$ of the unit A first qualification signal memorizing relay AS1, the make contact $as2$ of the unit A second qualification signal memorizing relay AS2, a break contact $as3'$ of the unit A third qualification signal memorizing relay AS3 and a break contact $as4'$ of the unit A fourth qualification signal memorizing relay AS4, while the negative side thereof is connected to a conductor 223. The positive side of the second qualification signal instructing relay KA2 is connected to the make contact $as1$ through a break contact $as2'$ of the unit A second qualification signal memorizing relay AS2, a make contact $as3$ of the relay AS3 and a break contact $as4'$ of the relay AS4, while the negative side thereof is connected to the conductor 223. The positive side of the third qualification signal instructing relay KA3 is connected to the break contact $as2'$ through a break contact $as3'$ of the relay AS3 and a make contact $as4$ of the relay AS4, and then connected to the conductor 222 through said break contact $as2'$, while the negative side thereof is connected to the conductor 223. The positive side of the fourth qualification signal instructing relay KA4 is connected to the conductor 222 through a break contact $as1'$ of the relay AS1, a make contact $as2$ of the relay AS2, a make contact $as3$ of the relay AS3 and a break contact $as4'$ of the relay AS4, while the negative side thereof is connected to the conductor 223. The positive side of the fifth qualification signal instructing relay KA5 is connected to the make contact $as2$ through a break contact $as3'$ of the relay AS3 and a make contact $as4$ of the relay AS4, and then to the conductor 222 through the make contact $as2$ and the break contact $as1'$, while the negative side thereof is connected to the conductor 223. Similarly, the positive side of the sixth qualification signal instructing relay KA6 is connected to the break contact $as1'$ through a break contact $as2'$ of the relay AS2, a make contact $as3$ of the relay AS3 and a make contact $as4$ of the relay AS4, while the negative side thereof is connected to the conductor 223.

FIG. 20 shows a qualification setting circuit for the unit A. In this embodiment, description will be made with reference to the case of forming 6 kinds of qualifications by combining the four basic qualification signals as shown in FIG. 19. A conductor 224 connected to the positive side of the power source has six input lines, i.e. conductors 225, 226 . . . 230 for setting six kinds of qualifications, connected thereto through the make contact $au$ of the unit A signal repeating relay AU and these conductors are extending through make contacts $ka1$, $ka2$ . . . $ka6$ of the unit A qualification signal instructing relays KA1, KA2 . . . KA6 respectively. Extending transversely of the vertical input lines are output lines which are provided in a number corresponding to the number of compartments in such a manner that they are not electrically conducted with the input lines. Namely, in this embodiment output lines of a number corresponding to 480 storage compartments arranged along 10 aisles are provided for each unit and each vertical input line and transverse output line is provided with a connecting pin insertion terminal $Cp$ through a diode $Di$ as shown in FIG. 20b, so that when an electrically conductive pin (not shown) is inserted into the terminal $Cp$, a current flows from the vertical input line to the transverse output line. The encircled terminal numbers denoted at the right side ends of the transverse output lines each indicate stage position by the number of the order of ones, bay position by the number of the order of tens, aisle position by the numbers of the order of hundreds and the order of thousands, the left side of an aisle by the letter L and the right side of an aisle by the letter R. Namely, $\overline{(L111)}$ indicates the compartment of the first aisle, left side, first bay and first stage. Each terminal is connected to the terminal of the corresponding number in FIG. 21.

FIG. 21 shows a storage position memorizing circuit for memorizing a storage position of the shiftable stack assembly in response to the storage position information and the qualification information read by the above-described circuits, FIG. 21a being a circuit for the first aisle of the unit A and FIG. 21b for the second aisle of the unit A. The circuits for the third to the tenth aisles are exactly the same as that shown in FIG. 21b, with the only exception that the reference numerals given to the respective constitutional elements to indicate the positions are different. Referring now to FIG. 21a, a circuit for memorizing the storage positions of the unit A, first aisle, first bay, comprises 12 storage position memorizing relays L111 . . . L116 and R111 . . . and R116 for memorizing the stage numbers on the left and right sides. The storage position memorizing relay L111 for memorizing the aisle, left side, first bay, first stage is connected at its positive side to a conductor 231 through its make-before-break contact $l111$, which conductor is connected to the positive side of the power source through a break contact $rla'$ of the restoring relay, and at its negative side to a conductor 232 through another make-before-break contact $l111'$. A break contact of the upper make-before-break contact $l111$ is connected to the associated terminal of the output line shown in FIG. 20a, while a break contact of the lower make-before-break contact $l111'$ is connected to a conductor 233 through a make contact $la1$ of a left side aisle separating relay LA1, the make contact $ea1$ of the first stage position signal repeating relay EA1 and a make contact $na1$ of the first bay position signal repeating relay NA1. The positive side of the storage position memorizing relay R111 for memorizing the first aisle, right side, first bay, first stage is connected to the conductor 231 through a make contact of its make-before-break contact r111, while the negative side thereof is connected to the conductor 232 through a make contact of another make-before-break contact r111'. A break contact of the upper make-before-break contact r111 is connected to the corresponding terminal, that is, the terminal $\overline{(R111)}$ in FIG. 20a, and a break contact of the lower make-before break contact r111' is connected to a terminal $\widehat{(1a)}$ through a make contact ra1 of a right side first aisle separating relay RA1. Character ASD designates a relay which verifies the fact that a desired storage position has been selected. Therefore, in this embodiment the transfer contact au" of the starting circuit (FIG. 5) in the first embodiment is substituted by a transfer contact asd" of this relay ASD, though not apparent in the drawings. The storage position memorizing circuits for the rest of 5 stages and for the respective bays have the same arrangement as described above. In the following description given with reference to the drawings, the numerals suffixed to the character L or R indicating the left side and right side respectively, indicate stage position by the numeral at the order of ones, bay position by the numeral at the order of tens and aisle position by the numeral at the order of hundreds, e.g. L146 means the first aisle, left side, fourth bay, sixth stage. The terminal $\widehat{(1a)}$ indicates that the terminal is connected to the terminal of the same number in FIG. 21b.

FIG. 22 is a diagram of a lamp illuminating and unlocking circuit for the unit A, first aisle for indicating a desired storage position by an indicator lamp 16 and unlocking a closure member 201. Namely, an indicator lamp 16–L111 to indicate the first aisle, left side, first bay, first stage and a magnet 213–L111 to unlock the closure member 201 at the said storage position, which is connected in parallel to said indicator lamp, are connected across a conductor 234, which is connected to the positive side of the power source through the make contact l111 of the storage position memorizing relay L111, and a conductor 235 which is connected to the negative side of the power source. Such arrangement is common to the circuits for the first aisle, left side first bay, first stage to the first aisle, right side, fourth bay, sixth stage, and also common to the second aisle and onwards, though not shown.

The storage position selection verifying circuit used in this embodiment is exactly identical with that of the first embodiment shown in FIG. 5 and will not be illustrated herein.

The operation of the shiftable stack assembly operating system according to this embodiment will be explained hereunder on the premise that a position card used has the recorded information unit A, first aisle, left side, first bay, first stage, which is similar to that used in the first embodiment.

Suppose that a qualification card 206 having a qualification information recorded thereon is magnetically recorded with a signal to cause a card reading operation to start and two conditional signals, i.e. signals to actuate the unit A qualification signal reading elements AD1 and AD2. Therefore, if the storage position designated by the position card should be opened by the insertion of the qualification card, all that is required is to insert a pin into the connecting pin insertion terminal Cp at the intersection of the output line connected to the terminal $\overline{(L111)}$ and the input line 225 shown in FIG. 20a. (The reason therefor will become apparent from the explanation to be given later.)

First of all, the position card 20 is inserted into the position card receiving slot 19. At this point, however, the present system does not yet commence the operation of reading the storage position recorded on the card. Then, the qualification card 206 is inserted into the qualification card receiving slot 208, whereupon the position reading operation is commenced for the first time. Namely, the starting signal reading element KD1 shown in FIG. 17 is energized to actuate the starting signal receiving relay KS1. Upon actuation of the relay KS1, the starting signal memorizing relay S1 shown in FIG. 18 is actuated and self-held with its make contact s1 closed, thus providing for reading of the position card.

Thereafter, the unit signal receiving relay A0, the aisle signal receiving relay P1, the bay position signal receiving relay N1 and the stage position signal receiving relay E1 are actuated according to the circuit shown in FIG. 4 of the first embodiment, and their make contacts ao, p1 and dl, shown in FIG. 15, are closed. Consequently, the unit A signal repeating relay AU is actuated.

On the other hand, the make contacts au, n1 and e1, shown in FIG. 16, are also closed, so that the unit A, first bay position signal repeating relay NA1 and the first stage position signal repeating relay EA1 are also actuated.

The position card reading operation as described above holds the relays LA1, NA1 and EA1 in an operative state, with their make contacts la1, na1 and ea1 shown in FIG. 21a closed and a closed circuit is formed on the negative side to select the relay L111.

On the other hand, for reading the qualification card the qualification signal receiving relays AK1 and AK2, connected in series to the unit A qualification signal reading elements AD1 and AD2, are actuated upon energization of said qualification signal reading elements successively after the starting signal has been read as described above. Therefore, the make contacts ak1 and ak2 of said qualification signal receiving relays, shown in FIG. 18, are closed, whereby the unit A qualification signal memorizing relays AS1 and AS2 are actuated and self-held. As a result, the make contacts as1 and as2 in the circuit shown in FIG. 19 are closed and the unit A qualification signal instructing relay KA1 is actuated.

By the qualification card reading operation as described above, the relay KA1 is held in an operative state and the make contact au shown in FIG. 20a is closed as a result of the selection of the unit A by the position card. Since the make contact ka1 is closed, a pin is inserted into the connecting pin insertion terminal Cp so that the input of a qualification signal is conducted from the input line 225 to the relay L111. Therefore, the output of a qualification signal appears at the terminal $\overline{(L111)}$. The operating circuit for the relay L111 is formed and the relay L111 is self-held, with its make contact l111 shown in FIG. 22 closed. The indicator lamp 16–L111 is turned on and the magnet 23–L111 is energized, so that the closure member 201 for the storage compartment of the unit A, first aisle, left side, first bay, first stage, is unlocked to be opened.

When the storage position has been selected by the position card and the qualification card in the manner described above, the storage position selection verifying relay ASD in the storage position memorizing circuit (FIG. 21a) is actuated and the transfer contact asd" of said relay ASD, substituting for the transfer contact au" in the unit A starting circuit, shown in FIG. 5, of the first embodiment, is shifted to the discharging side of the condenser Ca1. The relay AS0 is actuated and self-held by the discharge of the condenser Ca1. The relay AS0 functions for a predetermined period of time until it is restored by the relay AS1. During this period, the first aisle, which is the designated aisle, is opened in the manner described with reference to the first embodiment and the indicator lamp 16 is turned on indicating the storage compartment of the left side, first bay, first stage.

After the position indicating signals on the position card and the qualification card have been read, the completion signal reading element KD2 in the starting signal reading circuit of FIG. 17 is energized upon reading a completion signal which is photoelectrically or magnetically recorded on the qualification card. The completion signal receiving relay KS2 is actuated and its make contact $ks2$ is closed. As a result, the completion signal repeating relay S2 shown in FIG. 18 is actuated, whereby the self-held relay in the qualification signal memorizing circuit is restored and the position card reading circuit is also restored by the restoration of the relay S1.

If the qualification signal recorded in the qualification card 206 is of the type which actuates the relays AK1 and AK3 shown in FIG. 17, the relay KA2 in FIG. 19 is actuated to close its contact $ka2$ shown in FIG. 20a, however, the qualification signal output does not appear at the terminal $\overline{(L111)}$, since the pin is not inserted into the terminal $Cp$ at the intersection of the output line connected to the terminal $\overline{(L111)}$ and the input line 66. Therefore, the shift stack assembly is not operated and no lamp indication is effected.

The fourth embodiment of the invention is shown in FIGS. 23 to 36 inclusive, which is the same as the third embodiment but is provided with means for recording the date of operaton, the number of the compartment handled, the number of the qualification card recorded on said card, etc.

As shown in FIG. 23, the control panel 12, fitted to the fixed stack, is provided, in addition to the position card receiving slot 19, the qualification card receiving slot 208 and the qualification card discharge opening 207, with manually operative dials 329 to 333 for recording the date, a clear key 336, a printing operation indicator lamp KL7 for indicating the completion of the printing operation, a position card operation indicator lamp KL8 for indicating the completion of the position card reading, and a qualification card operation indicator lamp KL9 for indicating the completion of the qualification card reading.

The recording means is shown in FIG. 24, and comprises day printing drums 340 and 341, month printing drum 342, year printing drums 343 and 344 and a fixed hyphen printing drum 345 for separating a date from other recorded numerals, all of which are operatively connected to the respective manually operative set dials 329 to 333 provided on the control panel 12 as shown in FIG. 24a, and further comprises a unit printing drum 346, aisle printing drums 347 and 348, a left and right indicator printing drum 349, a bay position printing drum 350, a stage position printing drum 351, article number printing drums 352 and 353, qualification number printing drums 355 and 356, qualification card number printing drums 357 and 358 and a hyphen printing drum 354 fixed between the article number printing drum 353 and the qualification number printing drum 358, each of which has a mechanism shown in detail in FIG. 24b. These printing drums 340 to 344, 346 to 353 and 355 to 358 are rotatably mounted on a fixed shaft 359. The manually operative set dials 329 to 333 are rotatably mounted on a fixed shaft 360 and drivingly connected with the respective printing drums through gears 361. All of the printing drums other than the month printing drum 342 and the hyphen printing drums 345 and 354 carry on the peripheral surfaces thereof numerical types from 1 to 0 and a hyphen type.

A mechanism for printing a storage position, such as unit and aisle, article number, qualification number and qualification card number, will be described with reference to FIG. 24b. The printing mechanism shown in FIG. 24b is adapted for printing, e.g. the order of tens of a qualification number of FIG. 24a. The first qualification number printing drum 355 has 10 vertically juxtaposed magnets 362 for attracting attraction members 364 which are connected at one end of pins 363 slidably extending through said respective magnets. Each of the attraction members 364 is biased by a spring 365 in a direction opposite to the attracting direction of the magnet. The other end of the pins 363 are supported by a supporting frame 366 which also supports pins of the other printing drums. A vertically movable plate 369 is biased upwardly by a spring 368 and has a projection 367 which is adapted to engage the other end of the pin 363 when said end of the pin is projected from the supporting frame 366 as a result of the attraction member 364 being attracted by the magnet 362 upon energization of said magnet. The upper portion of the other side of the vertically movable plate is provided with a rack 271 which is engaging with a gear 370 fixed to one side of the printing drum 355, the arrangement being such that when the vertically movable plate is engaged by the lowermost pin 363–1, a type of numeral "1" on the printing drum 355 is placed in printing position. The vertically movable plate 369 is supported and guided by guide pins 373 which are loosely received in slots 372 formed in said plate in the moving direction thereof. Numeral 374 designates a retainer pin by which the vertically movable plate 369 is held in the position shown. Although the printing mechanism has been described with particular reference to one for printing the first qualification number, the other printing mechanisms are exactly the same as that described above and will not be illustrated herein.

On the opposite side of these printing drums is provided a printing hammer 377 which is connected at one end to a plunger 375' extending through a solenoid-type magnet 375 and adapted to make a pivotal movement about a pivot pin 376 to effect printing when said magnet is energized to retract the plunger. Numeral 378 designates a spring by which the printing hammer 377 is returned to its original position after de-energization of the magnet 375. A recording sheet 379 supplied from a reel 384 is passed between two sheet guiding members 382 and taken up on a take-up reel 380 while being guided by guide rolls 383 and 381. Numeral 385 designates a plate by which formation of spots on the recording sheet is prevented. A mechanism for forwarding the recording sheet 379 in each printing operation is well known in typewriters or the like and therefore not illustrated herein. A carbon tape used for printing is also moved along with the recording sheet 379, though not apparent in the drawing.

FIG. 25 is a diagram of a system starting circuit and a circuit for receiving signals representative of a unit symbol and an aisle number recorded on a position card. The starting circuit comprises a clear signal receiving relay CL and a signal receiving starting relay SO. The clear signal receiving relay CL is connected at one terminal to a conductor 301, connected to the positive side of the power source, through a make contact C of the clear key 336 on the control panel 12, and at the other terminal to a conductor 302 connected to the negative side of the power source. The signal receiving starting relay SO is connected at one terminal to the conductor 301 through a make contact K$mt$ of a qualification signal memorization verifying relay KMT shown in FIG. 35, a break contact $cl'$ of the clear signal receiving relay CL, a break contact $sa1'$ of a restoring relay SA1 shown in FIG. 36 and a break contact $sb1'$ of a unit B restoring relay (not shown), and at the other terminal to the conductor 302.

The unit signal receiving circuit comprises unit reading means UD and unit selection signal receiving relays AO and BO, connected between a conductor 301', which is connected to the conductor 301 through the make contact $so$ of the signal receiving starting relay SO, and the conductor 302, said unit reading means UD being composed of a unit A reading element and a unit B reading element which are connected with each other in parallel and adapted to be actuated by a contact, a photoelectric tube or a magnetic head, and said unit selection signal receiving relays AO and BO being connected in series to said unit reading elements respectively and adapted to be actuated upon energization of said respective elements.

The aisle signal receiving circuit comprises an aisle first signal receiving circuit for receiving a signal representative of the numeral at the order of tens of an aisle number and an aisle second signal receiving circuit for receiving the numeral at the order of ones of the aisle number. The aisle first signal receiving circuit comprises aisle first reading means FTD and aisle first signal receiving relays FT0 and FT1, connected between the conductors 301' and 302, the said aisle first reading means FTD comprising an aisle first reading element FTD0 for reading the numeral in the order of tens of the aisle number being "0" and an aisle first reading element FTD1 connected to the said first element in parallel and adapted for reading the numeral in the order of tens of the aisle number being "1," and the said aisle first signal receiving relays FT0 and FT1 being connected in series to the said reading elements respectively and adapted to be actuated thereby upon energization of the said reading elements. Likewise, the aisle second signal receiving circuit is adapted for receiving a signal representative of the numeral in the order of one of an aisle number, and comprises aisle second reading means FD having 10 aisle second reading elements FD0, FD1 . . . FD9 and aisle second signal receiving relays F0, F1 . . . F9 connected in series to said respective reading elements.

The left or right side of an aisle, bay position and stage position on the position card are read by the left or right, bay position and stage position reading circuits shown in FIG. 4 of the first embodiment, and therefore will not be described nor illustrated herein.

FIG. 26 is a diagram of a circuit for reading the article number recorded on the position card. Article numbers are given to the articles stored in every storage compartments in series. The article number reading circuit comprises an article number first signal receiving circuit for receiving a signal representative of the numeral in the order of tens of the article number and an article number second signal receiving circuit for receiving a signal representative of the numeral in the order of ones of the article number.

The article number first signal receiving circuit comprises article number first reading means HTD and article number first signal receiving relays HT0, HT1, HT2 and HT3, connected between conductors 303 and 304 which are respectively connected to the conductors 301' and 302 in parallel, said article number first reading means HTD having four article number first reading elements HTD0, HTD1, HTD2 and HTD3 adapted for reading the numeral in the order of tens of an article number being "0," "1," "2" and "3" respectively, and the said article number first signal receiving relays being connected in series to said article number first reading elements respectively.

Likewise, the article number second signal receiving circuit comprises article number second reading means HD and article number second signal receiving relays H0, H1 . . . H9, connected between the conductors 303 and 304, the said article number second reading means HD having ten article number second reading elements HD0, HD1 . . . HD9 connected with each other in parallel and the said article number second signal receiving relays being connected to the said article number second reading elements in series respectively.

FIG. 27 is a diagram of a circuit for forming a series of signals from 0 to 10 according to the signal received by the aisle first and second signal receiving circuits shown in FIG. 25, and this circuit comprises aisle signal forming relays P1 . . . P10 for 10 aisles. The positive side of the aisle signal forming relay P1 is connected at one terminal to a conductor 305, connected to the positive side of the power source, through the make contact $ft0$ of the aisle first signal receiving relay FT0 and the make contact $f1$ of the aisle second signal receiving relay F1. The positive sides of the aisle signal forming relays P2 . . . P9 are respectively connected between the make contacts $ft0$ and $f1$ through the make contacts $f2$ . . . $f9$ of the aisle second signal receiving relays F2 . . . F9. The positive side of the aisle signal forming relay P10 is connected to the conductor 305 through the make contact $ft1$ of the aisle first signal receiving relay FT1 and the make contact $f0$ of the aisle second signal receiving relay F0. The negative sides of these relays P1 . . . P10 are respectively connected to a conductor 306 which is connected to the negative side of the power source.

FIG. 28 is a diagram of a circuit for detecting the operation of the relays in the above-described circuits. Namely, this circuit detects whether one relay is operating for each of the unit, aisle, left or right, bay position and stage position signal receiving circuits and thereby prevents faulty operation of the system. For this purpose, the circuit comprises a unit signal detecting relay SY1, an aisle first signal detecting relay SY2, an aisle second signal detecting relay SY3, an aisle's left or right signal detecting relay SY4, a bay position signal detecting relay SY5, a stage position signal detecting relay SY6 and a signal detection verifying relay ABS. The positive side of the unit signal detecting relay SY1 is connected to a conductor 307, connected to the positive side of the power source, through a circuit comprising the make contact $ao$ of the unit signal receiving relay AO and the break contact $bo'$ of the unit signal receiving relay BO connected with each other in series, and the break contact $ao'$ of the relay AO and the make contact $bo$ of the relay BO which are connected with said make contact $ao$ and said break contact $bo'$ in parallel. The aisle first signal detecting relay SY2 has the positive side thereof connected to the conductor 307 through a circuit comprising the make contact $ft0$ of the aisle first signal receiving relay FT0 and the break contact $ft1'$ of the aisle first signal receiving relay FT1 which are connected with each other in series, and the break contact $ft0'$ of said relay FT0 and the make contact $ft0$ of said relay FT0 which are connected with said make contact $ft0$ and said break contact $ft1'$ in parallel. The positive side of the aisle second signal detecting relay SY3 is connected to the conductor 307 through a ladder-type circuit comprising the make contact $fo$ of the aisle second signal receiving relay F0 and the break contacts $f1'$, . . . $f9'$ of the aisle second signal receiving relays F1 . . . F9, which are connected with each other in series; the break contacts $f0'$ . . . $f8'$ and the make contact $f9$, which are connected with each other in series and with said make contact $f0$ and said break contacts $f1'$ . . . $f9'$ in parallel; and the make contacts $f1$ . . . $f8$ respectively connected across between the break contacts $f1'$ and $f2'$ and between the break contacts $f0'$ and $f1'$, across between the break contacts $f2'$ and $f3'$ and between the break contacts $f1'$ and $f2'$, and so on. The positive side of the left or right signal detecting relay SY4 is connected to the conductor 307 through a circuit comprising the make contact $dl$ of the aisle left side signal receiving relay DL and the break contact $dr'$ of the aisle right side signal receiving relay DR which are connected with each other in series, and the break contact $dl'$ and the make contact $dr$ which are connected with each other in series and with said make contact $dl$ and said break contact $dr'$ in parallel. The positive side of the bay position signal detecting relays SY5 is connected to the conductor 307 through a ladder-type circuit comprising the make contact $n1$ of the bay position signal receiving relay N1 and the break contacts $n2'$, $n3'$ and $n4'$ of the bay position signal receiving relays N2, N3 and N4, which are connected with each other in series; the break contacts $n1'$, $n2'$ and $n3'$ and the make contact $n4$ which are connected with each other in series and with said make contact $n1$ and said break contacts $n2'$, $n3'$ and $n4'$ in parallel; and the make contacts $n2$ and $n3$ which are respectively connected across between the break contacts $n2'$ and $n3'$ and between the break contacts $n1'$ and $n2'$ and across between the break contacts $n3'$ and $n4'$ and between the break contacts $n2'$ and $n3'$. The positive side of the stage position signal detecting relay SY6 is connected to the conductor 307 through a ladder-type circuit comprising the make contact $e1$ of the stage position receiving relay E1 and the break contacts $e2' \ldots e6'$ of the stage position signal receiving relays E2 ... E6, which are connected with each other in series; the break contacts $e1' \ldots e5'$ and the make contact $e6$ which are connected with each other in series and with said make contact $e1$ and said break contacts $e2' \ldots e6'$ in parallel; and the make contacts $e2 \ldots e5$ which are respectively connected across between the break contacts $e2'$ and $e3'$ and between the break contacts $e1'$ and $e2'$, across between the break contacts $e3'$ and $e4'$ and between the break contacts $e2'$ and $e3'$, etc. The signal detection verifying relay ABS is connected to the conductor 307 through make contacts $sy1 \ldots sy6$ of these detecting relays SY1 ... SY6, which are connected with each other in series. The negative sides of the detecting relays SY1 ... SY6 and the signal detection verifying relay ABS are respectively connected to a conductor 308 which is in turn connected to the negative side of the power source.

The starting circuit for the body of the shiftable stack assembly and the left and right separating circuit are of exactly the same construction as that of the third embodiment shown in FIG. 15, except that the make contact $abs$ of the signal detection verifying relay ABS connected to the positive side of the unit A starting relay AU is connected between the make contact $ao$ of the unit signal receiving relay AO, the break contacts $Ar'$ and $Al'$ of the discriminating relay and the make contact $au$ of the unit A starting relay AO, and, therefore, will not be described and illustrated herein.

FIG. 29 is a diagram of a unit A qualifications signal receiving circuit and a qualification card number signal receiving circuit which are adapted to be operated on insertion of a qualification card 206 into the qualification card receiving slot 208 shown in FIG. 23. The qualification signal receiving circuit comprises unit A qualification signal reading means AD and unit A qualification signal receiving circuit which are connected between a conductor 311, connected to the positive side of the power source through a make contact $kmt$ of a qualification signal memorization verifying relay KMT shown in FIG. 36, and a conductor 312 connected to the negative side of the power source. The unit A qualification signal reading means AD consists of four unit A qualification signal reading elements AD1 ... AD4, while the unit A qualification signal receiving circuit consists of unit A qualification signal receiving relays AK1 ... AK4 which are connected to said elements AD1 ... AD4 in series respectively.

The qualification card number signal receiving circuit is composed of a first signal receiving circuit adapted for receiving a signal representative of the numeral in the order of tens of a qualification card number and a second signal receiving circuit adapted for receiving a signal representative of the number in the order of ones of the qualification card number. The first signal receiving circuit comprises qualification card number first reading means MD having ten qualification card number reading elements MD0 ... MD9, and qualification card number first signal receiving relays MK0 ... MK9 respectively connected with said elements in series, all of which elements and relays are connected in parallel between the conductors 311 and 312. Likewise, the second signal receiving circuit comprises qualification card number second reading means TD having ten qualification card number second reading elements TD0 ... TD9, and qualification card number second signal receiving relays TK0 ... TK9 connected with said elements in series respectively, all of which elements and relays are connected in parallel between the conductors 311 and 312.

FIG. 30 shows a unit A qualification signal memorizing circuit having four unit A qualification signal memorizing relays AS1 ... AS4. The positive side of the qualification signal memorizing relay AS1 is connected to a conductor 313 through a make contact $ak1$ of the unit A qualification signal receiving relay AK1 and a conductor branched from between the make contact $ak1$ and the relay AS1 is connected to a conductor 313', branched from the conductor 313, through a make contact $as1$ of said relay AS1. The negative side of the relay AS1 is connected to a conductor 314. Similarly, the unit A qualification signal memorizing relays AS2, AS3 and AS4 are connected at their positive sides to the conductors 313 and 313' through make contacts $ak2$ and $as2$, make contacts $ak3$ and $as3$ and make contacts $ak4$ and $as4$ respectively and at their negative sides to the conductor 314. The conductor 313 is connected to the positive side of the power source through the break contact $Cl'$ of the clear signal receiving relay CL (FIG. 25) and the break contact $sa1'$ of the unit A restoring relay SA1 (FIG. 36), and the conductor 314 is connected to the negative side of the power source.

In FIG. 31, there is shown a diagram of a circuit for memorizing a signal representative of a qualification card number, said circuit comprising a qualification card number first memorizing circuit adapted for memorizing the numeral in the order of tens of a qualification card number and a qualification card number second memorizing circuit adapted for memorizing the numeral in the order of ones of the qualification card number. The qualification card number first memorizing circuit comprises ten qualification card number first memorizing relays M0, M1 ... M9. The positive side of the qualification card number first memorizing relay M0 is connected to a conductor 315 through a make contact $mk0$ of the qualification card number first signal receiving relay MK0 and a make contact $mo$ of said relay MO is connected between a conductor 315', branched from the conductor 315, and a conductor between the make contact $mk0$ and the relay MO. The negative side of the relay M0 is connected to a conductor 316. Similarly, the qualification card number first memorizing relays M1 ... M9 are connected at the positive sides to the conductors 315 and 315' through make contacts $mk1$ and $m1$, $mk2$ and $m2$ ... $mk9$ and $m9$ respectively, and at the negative sides to the conductor 316. The qualification card number second memorizing circuit likewise has 10 qualification card second memorizing relays T0, T1 ... T9 which are connected to the conductors 315 and 315' at the positive sides and to the conductor 316 at the negative sides, like the qualification card first memorizing relays. The conductor 315 is connected to the positive side of the power source through the break contacts $cl'$ and $sa1'$ and a break contact $sb1'$ of a unit B restoring relay (not shown), and the conductor 316 is connected to the negative side of the power source.

FIG. 32 is a diagram of an operating circuit for the magnets 362 which are provided in the typing mechanism, previously described with reference to FIG. 24b, to operate the respective pins 363. The symbols suffixed to the respective reference numerals designating the magnets are for the purpose of identifying units, aisles, etc., though not apparent from FIG. 24b. A unit printing magnet circuit comprises two magnets 362–1–$a0$ and 362–2–$b0$ for printing the units A and B respectively which are connected to a conductor 317, connected to the positive side of the power source, through the make contacts $ao$ and $bo$ of the unit receiving relays A0 and B0 at their positive sides and to a conductor 318, connected to the negative side of the power source, at their negative sides. An aisle printing magnet circuit for printing an aisle number comprises two magnets 362–0–$ft0$ and 362–1–$ft1$ for printing the numeral in the order of tens place of an aisle number and ten magnets 360-0–f0 . . . 362-9–f9 for printing the numeral in the order of ones of an aisle number. These magnets are connected in parallel between the conductors 317 and 318 through the make contacts ft0 and ft1 of the aisle first signal receiving relays FT0 and FT1 and the make contacts f0 . . . f9 of the aisle second signal receiving relays F0 . . . F9 respectively. An aisle's left or right printing magnet circuit, bay position and stage position printing magnet circuits and an article number printing magnet circuit are composed similarly.

FIG. 33 shows a circuit consisting of a qualification number printing magnet circuit, a qualification card number printing magnet circuit and a printing magnet circuit for operating the retainer pin 374 and the printing hammer 377 shown in FIG. 24b, said circuit having the same construction as that shown in FIG. 32. A unit A qualification number printing signal circuit has six magnets 362–1–ka1 . . . 362–6–ka6, which are connected in parallel between a conductor 319, connected to the positive side of the power source, and a conductor 320, connected to the negative side of the power source, through the make contacts ka1 . . . ka6 of the unit A qualification signal instructing relays KA1 . . . KA6 shown in FIG. 19, respectively. The qualification card number printing magnet circuit comprises ten magnets 362–0–m0 . . . 362–9–m9 for printing the order of tens of a qualification card number and ten magnets 362–0–t0 . . . 362–9–t9 for printing the order of ones of a qualification card number, and these magnets are connected in parallel between the conductors 319 and 320 through the make contacts m0 . . . m9 of the qualification card number first memorizing relays M0 . . . M9 and the make contacts t0 . . . t9 of the qualification card number second memorizing relays T0 . . . T9 respectively.

The magnet circuit for the retainer pin and the printing hammer comprises a stopper pin operating magnet 374a and the printing hammer operating magnet 375 which are also connected in parallel between the conductors 319 and 320 through a make contact sa5 of a retainer pin operating relay SA5 and a make contact sa3 of a printing hammer operating relay SA3, shown in FIG. 36.

FIG. 34 shows a circuit of the operation indicator lamps shown in FIG. 23, which comprises a printing operation indicator lamp KL7 to indicate printing operation, a position card operation indicator lamp KL8 to indicate position card operation and a qualification card operation indicator lamp KL9 to indicate qualification card operation. These indicator lamps are connected in parallel between a conductor 321, connected to the positive side of the power source, and a conductor 322 connected to the negative side of the power source, through the make contact sa3 of the printing hammer operating relay SA3, the make contact abs of the signal detection verifying relay ABS and the make contact kmt of the qualification signal memorization verifying relay KMT, shown in FIG. 36, respectively.

FIG. 35 shows a qualification signal memorization verifying circuit in the qualification signal instructing circuit for the unit A, which has such a construction as that used in the third embodiment. A circuit used for the unit B for the same purpose is similar to that for the unit A, though not shown.

The qualification signal memorization verifying circuit has a qualification signal memorization verifying relay KMT. The positive side of the qualification signal memorization verifying relay KMT is connected to a conductor 323, connected to the positive side of the power source, through make contacts ka1 . . . ka6 and kb1 . . . kb6 of the unit A qualification signal instructing relays KA1 . . . KA6 in the third embodiment shown in FIG. 19 and the unit B qualification signal instructing relays (not shown), which make contacts are connected with each other in parallel respectively; the make contacts m0 . . . m9 of the qualification card number first memorizing relays M0 . . . M6, which are connected with said make contacts ka1 . . . ka6 and kb1 . . . kb6 in series and connected with each other in parallel; the make contacts t0 . . . t9 of the qualification card number second memorizing relays T0 . . . T9, which are connected with said make contacts m0 . . . m9 in series and connected with each other in parallel; and a variable resistor VR2. The negative side of the relay KMT is connected to a conductor 324 connected to the negative side of the power source. A condenser Ca3 is connected in parallel to the relay KMT, so that the relay KMT will operate with a certain time limit.

A qualification setting circuit, a storage position memorizing circuit, and an indicator lamp and a closure member unlocking circuit, used in this embodiment, are exactly the same as those of the third embodiment shown in FIGS. 20 to 22, and will not be described herein.

FIG. 36 is a diagram of a storage position selection verifying circuit which comprises six relays, i.e. the double winding-type starting relay AS0, the restoring relay SA1 for the entire system, the printing verifying relay SA2, the printing hammer operating relay SA3, the retainer pin operation verifying relay SA4 and the retainer pin operating relay SA5. One of the positive terminals of the starting relay AS0 is connected to a conductor 325, connected to the positive side of the power source, through the break contact sa1' of the relay SA1, while another of the positive terminals is connected to a condenser Ca6 through the transfer contact asd" of the relay ASD. The negative side of the relay AS0 is connected to a conductor 326 which is connected to the negative side of the power source. The transfer contact asd" is connected in such a manner as to charge a condenser Ca6 when the relay ASD is not actuated and to flow the discharge current of the condenser Ca6 through the relay ASD when the relay ASD is actuated, said condenser Ca6 being connected to the movable contact side of the transfer contact asd". The positive side of the restoring relay SA1 is connected to the conductor 325 through the make contact sa2 of the relay SA2 and a variable resistor VR3, and the negative side thereof is connected to the conductor 326. A condenser Ca5 is provided in parallel to the relay SA1 with the positive side connected between the relay SA1 and the variable resistor VR3 and the negative side connected to the conductor 326. The positive side of the printing operation verifying relay SA2 is connected to the conductor 325 through a printing detecting switch SC1 and through the make contacts as0 and sa2 of the relays AS0 and SA2, which make contacts as0 and sa2 are connected between said switch SC1 and said relay SA2, said switch SC1 being adapted to be engaged by an end of the plunger 375' when said plunger is retracted upon energization of the solenoid-type magnet 375 shown in FIG. 24. The negative side of the relay SA2 is connected to the conductor 326. The positive side of the printing hammer operating relay SA3 is connected to a condenser Ca4 through a transfer contact sa4" of the relay SA4, and the negative side thereof is connected to the conductor 326. The transfer contact sa4" is connected to the conductors 325 and 326 through the condenser Ca4, like the aforesaid transfer contact asd". The retainer pin operation verifying relay SA4 also has the positive side connected to the conductor 325 through the make contact sa5 of the relay SA5 and a retainer pin operation detecting switch SC2, shown in FIG. 24, which is adapted to be engaged by the retainer pin 374 when the said retainer pin is in its highest position. The positive side of the retainer pin operating relay SA5 is connected to the conductor 325 through the make contact as0 of the relay AS0 and the break contact sa2' of the relay SA2. The negative sides of the relays SA4 and SA5 are connected to the conductor 326 respectively.

Now, the fourth embodiment of the invention will be described hereunder: Suppose that a position card 20 to be used has a recorded information designating article number 1 at the unit A, first aisle, left side, first bay, first stage, as that used in the first and third embodiments. These informations are all coded numerically, i.e. the unit A is coded as numeral "1," the unit B into numeral "2," ten aisles as numerals "01" to "10," the left side of aisle as numeral "1," the right side of aisle into numeral "2," four bay positions into numerals "1" to "4," six stage positions into numerals "1" to "6" and the articles stored in each storage compartment into numerals "01" to say "30" when the number of articles is 30. Therefore, in this embodiment the position card has the recorded information coded as "10111101." On the other hand, a qualification card 206 to be used is recorded by two basic qualification signals, that is, any one of the combinations of these two basic qualification signals, and also with two numerals representing the owner of the qualification card. In the following description, use is made of a qualification card which is recorded by signals to actuate the unit A qualification signal reading elements AD1 and AD2, and a card number "11." In this case, if the above-mentioned storage compartment is openable by this qualification card, a pin is inserted in the connecting pin insertion terminal Cp at the intersection of the input line 225 and the output line connected the terminal (L111) shown in FIG. 20a. (The reason for this will be apparent from the description of the third embodiment.)

First of all, the position card 20 is inserted into the position card receiving slot 19 and then the qualification card 206 is inserted into the qualification card receiving slot 208, whereupon the present system is placed in operation. Namely, the qualification card 206 is read by the circuit of FIG. 29 at first. In practice, the unit A qualification signal reading elements AD1 and AD2 are energized and the qualification signal receiving relays AK1 and AK2, connected to said respective elements in series, are actuated in sequence. At the same time, the qualification card number first and second reading elements MD1 and TD1 are energized by the card number recorded in the qualification card and the qualification card first and second signal receiving relays MK1 and TK1, connected to said respective elements in series, are actuated. The signals received are memorized by the memorizing circuits. Namely, the make contacts ak1 and ak2 shown in FIG. 30 are closed to actuate the unit A qualification signal memorizing relays AS1 and AS2 and these relays are self-retained with their make contacts as1 and as2 closed. Similarly, the make contacts mk1 and tk1 shown in FIG. 31 are closed and the qualification card number first and second memorizing relays M1 and T1 are actuated and self-held with their make contact m1 and t1 closed. Consequently, the make contacts as1 and as2 in the circuit of the third embodiment shown in FIG. 19 are closed to actuate the unit A qualification signal instructing relay KA1. Furthermore, as shown in FIG. 35, the qualification signal memorization verifying relay KMT for verifying the fact that the qualification signal and the qualification card number formed from the basic qualification signals on the qualification card, is actuated through the variable resistor VR2 upon closure of the make contacts ka1, m1 and t1. It will be understood, however, that this relay KMT is allowed to operate by the condenser Ca3 with a certain time limit.

As a result of actuation of the relay KMT, the position card signal receiving circuit of FIG. 25 starts to operate. Namely, the signal receiving starting relay S0 is actuated upon closure of the make contact kmt of the relay KMT, so that the make contact so is closed and the position card reading operation is commenced.

The unit A reading element UDA, the aisle first reading element FTD0 for reading the numeral in the order of tens of the aisle number being "0," the aisle second reading element FD1 for reading the numeral in the order of ones of the aisle number being "1," the left position reading element FDL for reading the position of an aisle being left side by the circuit of the first embodiment shown in FIG. 4, the bay position reading element ND1 for readng the bay being the first bay and the stage position reading element ED1 for reading the stage being the first stage, shown in FIG. 25, and the article number first reading element HTD1 for reading the numeral in the order of tens of an article number being "1" and the article number second reading element HD1 for reading the numeral in the order of ones of an article number being "1," shown in FIG. 26, are energized upon insertion of the position card 20, and thereby the unit A signal receiving relay AO, the aisle first signal receiving relay FT0, the aisle second signal receiving relay F1, the left side signal receiving relay DL, the bay position receiving relay N1, the stage position signal receiving relay E1, the article number first signal receiving relay HT1 and the article number second signal receiving relay H1, which are connected in series with the aforesaid elements respectively, are actuated, closing their make contacts and opening their break contacts.

Thus, the make contacts ft0 and f1 in the aisle signal forming circuit of FIG. 27 are closed and the aisle signal forming relay P1 is actuated.

On the other hand, in the operating relay number detecting circuit of FIG. 28 for detecting whether the informations recorded on the position card 20 have been read completely, the unit signal detecting relay SY1 is actuated upon closure of the make contact ao, and its make contact sy1 is closed and the make contact ft0 is also closed. The aisle first signal detecting relay SY2 is actuated with the make contact sy2 thereof closed. Similarly, the aisle second signal detecting relay SY3 is actuated through the make contact f1, the left and right signal detecting relay SY4 through the make contact dl, the bay position signal detecting relay SY5 through the make contact n1 and the stage position signal detecting relay SY6 through the make contact e1, and the make contacts sy3, sy4, sy5 and sy6 of these relays are closed. By the actuation of these relays, the signal detection verifying relay ABS is actuated. As such, the operating relay number detecting circuit serves to verify the fact that all the informations required for the operation of the present system have been accurately read from the position card and also to prevent an erroneous opeation possibly caused by dual recording, for example, of an aisle number on the position card.

By the actuation of the signal detection verifying relay ABS, its make contact abs is closed and a closed circuit is formed extending from the positive side to the negative side of the power source through the break contacts Ar' and Al', the make contacts abs (not shown) and ao and the relay AU in FIG. 15, whereby the relay AU is actuated. Through the relay AU, the starting relay AA1 in the shiftable stack assembly starting circuit and the left aisle separating relay LA1 in the left and right separating circuit are actuated and the make contacts of these relays are closed. On the other hand, the bay position signal repeating relay NA1 and the stage position signal repeating relay EA1 in the unit A bay position and stage position signal repeating circuit of FIG. 16 are also actuated, with their make contacts na1 and ea1 closed.

By reading the qualification card in the manner described, the system operates according to the circuits of the third embodiment shown in FIGS. 19 to 22, to drive the body of the shiftable stack assembly, to open the first aisle recorded on the position card, to turn the indicator lamp 16–L111 on indicating the storage compartment on the left side of the aisle, first bay, first stage and to unlock the closure member 201 for the said storage compartment by the action of the magnet 213–L111.

The informations on the position card and the qualification card are recored on a recording tape in a manner to be described hereunder:

The date dials 329 ... 333 on the control panel 12, shown in FIG. 23, are manually operated to set the date at which the system is operated. Namely, the day is set by rotating the dials 329 and 330, the month by rotating the dial 331 and the year by rotating the dials 332 and 333. The rotation of these dials causes rotation of the associated printing drums 340 ... 344 through the respective gears 361, whereby the types representing the desired date are set in the printing position facing the recording sheet 379.

On the other hand, the position information and the article number on the position card and the qualification signal and the qualification card number on the position card set for printing by the circuits of FIGS. 32 and 33. Namely, according to the position information, the make contacts $ao$, $ft0$, $f1$, $dl$, $n1$, $e1$, $ht0$ and $h1$, shown in FIG. 32, are closed, whereby the magnets 362, shown in FIG. 24b and connected to said respective contacts in series, are energized to operate the associated printing drums in the following manner: Namely, in the printing mechanism for printing the unit A the magnet 362–1 is energized, so that the attraction member 364–1 is attracted by said magnet causing the pin 363–1 to project to a position to be engaged by the projection 367 of the vertically movable plate 369 and thereby providing for printing of a numeral "1" on the recording sheet 379. In the same manner, pins for printing numerals "0" and "1" to indicate the first aisle, a pin for printing a numeral "1" to indicate the left side of an aisle, pins for printing numerals "1" and "1" to indicate the first bay and the first stage and pins for printing numerals "0" and "1" to indicate an article number "01" are projected for engagement with the projections of the associated vertically movable plates. On the other hand, in the circuit of FIG. 33 the make contacts $ka1$, $m1$ and $t1$ are closed according to the qualification information and the magnets 362, connected in series with said respective contacts, are energized, whereby a pin for printing a numeral "1" to indicate the qualification for the unit A and pins for printing a numeral "11" to indicate the qualification card number are projected.

While the aforesaid recording operation is in process, the transfer contact $asd''$ in the storage position selection verifying circuit of FIG. 36 is shifted on actuation of the relay ASD of FIG. 21a to allow the discharge current of the condenser $Ca1$ to flow through the relay AS0 to actuate the same, whereby the relay AS0 is actuated and self-held with its make contact $as0$ closed. As a result, the retainer pin operating relay SA5 is actuated to energize the magnet 374 in the circuit of FIG. 33. The retainer pin 374 is moved upwardly allowing the vertically movable plate 369 in each printing mechanism to move upwardly while rotating the associated printing drum by the rack 371. The vertically movable plate 369 engages the projecting pin and is stopped thereby. The retainer pin 374 actuates the retainer pin operation detecting switch SC2 in its highest position, so that the retainer pin operation verifying relay SA4 shown in FIG. 36 is actuated and its transfer contact $sa4''$ is shifted. The printing hammer operating relay SA3 is actuated by the discharge current of the condenser $Ca4$ and its make contact $sa3$ shown in FIG. 33 is closed. Therefore, the printing hammer 377 is operated to print the date, the storage position, the article number, the qualification number of the attendant, the card number, etc. are printed on the recording sheet 379. Upon energizaiton of the magnet 375, the printing detecting switch SC1 is closed and the printing verifying relay SA2 in the circuit of FIG. 36 is actuated and self-held. The restoring relay SA1 is operated by the condenser $Ca5$ with a certain time limit to restore the starting circuit of FIG. 25, the qualification signal memorizing circuit and the qualification card number memorizing circuit of FIGS. 30 and 31, and the relay AS0 in the circuit of FIG. 36. Since a certain time passes before the relay SA1 is actuated, as described previously, the contact $aso$ in the starting circuit for the shiftable stack assembly unit A as shown in FIG. 6 remains closed, and further, since the relay P1 is in an operative position as described before, its make contact $p1$ is closed and the starting relay AA1 for starting the shiftable stack assembly is actuated. Therefore, the shiftable stack assembly starts to move to form the first aisle of the unit A.

On the other hand, the make contacts $sa3$, $abs$ and $kmt$ of the relays SA3, ABS and KMT are closed upon actuation of said relays, and the printing operation indicator lamp KL7, the position card operation indicator lamp KL8, and the qualification card operation indicator lamp KL9, provided on the control panel 12 shown in FIG. 34, are lighted one after another, informing the operator of the respective operations.

Upon completion of the article storing or taking-out operation, the restoring button 18 is depressed, whereupon the break contact $rla'$ of the unit A, first aisle storage position memorizing circuit is opened, allowing the relay L111 to return to its original position. If the restoring button is not depressed, the system is incapable of reading the next position card because the break contacts $Ar'$ and $Al'$ of the unit starting circuit (FIG. 15) is opened.

On the recording sheet 379 is recorded the date of operation, the storage position, the article number, the qualification number and the qualification card number in the form of a code symbol, e.g. "10 DEC '68–10111101–3–11," if the first article in the storage compartment at the unit A, first aisle, left side, first bay, first stage is handled on Dec. 10, 1968 by the attendant who is assigned with a qualification signal of the third qualified person for actuating the unit A qualification signal reading elements AD1 and AD4 and with a qualification card number 11. The first hyphen in the code symbol is for the purpose of separating the date from the storage position and the second hyphen is for the purpose of separating the storage position from the qualification number and the third hyphen is for the purpose of indicating the fact that the pertinent attendant is not qualified for operating the unit B. If the attendant is qualified for operating the unit B, a numeral from 1 to 6 should appear in the position.

In the embodiment described above, each printing mechanism comprises ten magnets 362 and ten pins 363 to set types 1 to 0, for example, of the printing drum 355 in the printing position as described and illustrated in FIG. 24. However, as may be understood from the foregoing description, a qualification signal for the unit A consists of a numeral from 1 to 6 and there is no qualification signal which consists of a numeral 0 and 7 to 9. Therefore, the magnets and pins for controlling these four positions may be eliminated. Furthermore, the hyphen sign is set at a location corresponding to the highest position of the retainer pin 374. According to this embodiment, the numbers of the magnets and the pins may be reduced to be equal to the number of the types required to indicate unit, the order of tens of aisle number, bay position, stage position, the order of tens of article number and the order of tens of a qualification card number.

In the fourth embodiment described above, the shiftable stack assembly operating system is provided with means for reading a desired storage position recorded on a position card. However, according to the fifth embodiment of the invention illustrated in FIGS. 37 to 40 inclusive, the operating system is designed such that the storage position of a desired article is fed to the system by operating a keyboard, like the system of the second embodiment described previously and the attendant accessible to said storage position is limited by a qualification card.

In FIG. 37, there is shown the control panel 12 provided on the stationary stack AK and on the control panel 12 is provided a set of keys from 0 to 9, instead of the position card 20 and the position card receiving slot 19 in the preceding embodiment. Furthermore, as shown in detail in FIG. 38, the control panel 12 is provided with unit operation indicator lamps KL10, aisle operation indicator lamps KL11 and KL12, an aisle's left and right operation indicator lamp KL13, a bay position operation indicator lamp KL14, a stage position operation indicator lamp KL15 and article number operation indicator lamps KL16 and KL17, instead of the position card operation indicator lamp KL8, which are associated with the key operation and by which the key operation of the operator is verified.

FIG. 39 is a diagram of a circuit which comprises a receiving circuit for receiving signals representative of the information pertaining to unit, aisle, left or right side of aisle, bay position, stage position and article number, which are successively supplied by the operation of the keys shown in FIG. 37, an operation verifying circuit for setting unit, aisle, etc. in accordance with these signals and an aisle signal forming circuit for forming a series of aisle signals by combining two aisle signals.

As may be understood from the drawing, the unit, aisle, left or right, bay position and stage position signal receiving circuit, the operation verifying circuit for verifying the operation in response to the said signals and the aisle signal forming circuit are exactly identical with those in the second embodiment and, therefore, will not be described again.

The article number signal receiving circuit comprises four article number first signal receiving relays HT0, HT1, HT2 and HT3 and ten article number second signal receiving relays H0, H1 ... H9. As in the second embodiment, the key 0 is connected to the break contact side of the upper make-before-break contact $ht0$ of the article number first signal receiving relay HT0 for receiving a signal indicating that the order of tens of an article number is "0," and to the break contact side of the upper make-before-break contact $h0$ of the article number first signal receiving relay H0 for receiving a signal indicating that the order of ones of an article number is "0." The negative side of the relay HT0 is connected to a conductor 401 through the break contact side of its lower make-before-break contact $ht0$, the make contact $hts$ of the stage position operation verifying relay HTS and a break contact $hs'$ of an article number first operation verifying relay HS to be described later. The negative side of the relay H0 is connected to the conductor 401 through the break contact side of its lower make-before-break contact $ho$, the make contact $hs$ of the article number first operation verifying relay HS and a break contact $abs'$ of an article number second operation verifying relay ABS. Similarly, the key 1 has the article number first signal receiving relay HT1 and the article number second signal receiving relay H1 connected thereto, and the key 2 has the article number first signal receiving relay HT2 and the article number second signal receiving relay H2 connected thereto, and so on, so that these relays may be actuated when the numerals in the order of tens and the order of ones of an article number are depressed by the keys.

The article number operation verifying circuit comprises the article number first operation verifying relay HS for verifying that the order of tens of an article number has been operated by the 7th key operation and the article number second operation verifying relay ABS for verifying that the order of ones of an article number has been operated by the 8th key operation. The positive side of the article number first operation verifying relay HS is connected to a conductor 402 through the make contacts $ht0$ ... $ht3$ of the article number first signal receiving relays HT0 ... HT3 which are connected with each other in series and a break contact $sx'$ connected to said make contacts in series, and through the make contact $hs$ of the relay HS which is connected between said break contact $sx'$ and said relay HS. The positive side of the article number second operation verifying relay ABS is connected to the conductor 402 through the make contact $h0$ ... $h9$ of the article number second signal receiving relays H0 ... H9 which are connected with each other in series and the break contact $sx'$ which is connected ot said make contacts in series, and through the make contact $abs$ of the relay ABS which is connected between said break contact $sx'$ and said relay ABS. The negative sides of these operation verifying relays are connected to a conductor 403 respectively which is connected to the negative side of the power source.

Now, the operation of the circuit described above will be described with reference to the case of handling an article assigned with article No. 1 and stored in a storage compartment at the unit A, first aisle, right side, first bay, first stage as in the case of the second embodiment. In the fourth embodiment described previously, these informations are recorded on a position card in the form of a numerical code. In the present embodiment, however, these informations are fed into the system by operating the keys as in the case of the second embodbiment. Namely, numeral "1" representing the unit A, numerals "0" and "1" representing the first aisle, numeral 2 representing the right side of the aisle, numeral "1" representing the first bay, numeral "1" representing the first stage and numerals "0" and "1" represent the article No. 1 are depressed by the keys in the order mentioned.

According to the second embodiment, the relays A0, FT0, F1, DR, N1 and E1 are actuated and self-held. A signal representative of the order of tens of the article number is received by the 7th operation of keys. Namely, by depressing the key 0 the relay HT0 is actuated and self-held and as a result, the article number first operation verifying relay HS is actuated and self-held. By the last key operation, i.e. by depressing the key 1, the article number second signal receiving relay H1 is actuated and self-held, and thus the article number second operation verifying relay ABS is actuated and self-held.

Thereafter, the shiftable stack assembly starting relay is actuated and then the aisle separating relay for memorizing the aisle number and left or right side of the aisle, and the bay and stage signal repeating relays are actuated respectively by the circuits of the third embodiment shown in FIGS. 15 and 16.

On the other hand, the qualification signal and the qualification card number are received by the circuit of FIG. 29 during the passage of the qualification card from the qualification card receiving slot 208 to the discharge opening 207, the qualification card being made in the same way as that used in the fourth embodiment.

After the qualification signal and the qualification card number have been received by the circuit of FIG. 29, the desired storage compartment is indicated and the closure member for said compartment is unlocked, and further recording is effected in the same manner as in the fourth embodiment.

A circuit of the operation indicator lamps, shown in FIGS. 37 and 38, comprises, as shown in FIG. 40, the printing operation indicator lamp KL7, the unit operation indicator lamp KL10, the aisle operation indicator lamps KL11 and KL12, the aisle left and right operation indicator lamp KL13, the bay position operation indicator lamp KL14, the stage position operation indicator lamp KL15, the article number operation indicator lamps KL16 and KL17 and the qualification operation indicator lamp KL19, which are connected in parallel between a conductor 404, connected to the positive side of the power source, and a conductor 405, connected to the negative side of the power source, through the respective make contacts $sa3$, $fts$, $fs1$, $fs2$, $ns$, $es$, $hts$, $hs$, $abs$ and $kmt$ of the printing hammer operating relay SA3, shown in FIG. 36 of the fourth embodiment, the unit operation verifying relay FTS, the aisle first operation verifying relay FS1, the aisle second operation verifying relay FS2, the left or right operation verifying relay NS, the bay position operation verifying relay ES, the stage position operation verifying relay HTS, the article number first operation verifying relay HS, the article number second operation verifying relay ABS, shown in FIG. 39, and the qualification signal memorization verifying relay KMT, shown in FIG. 35, respectively, said indicator lamps being turned on one after another upon actuation of the respective relays.

Although in each of the embodiments illustrated hereinabove, use is made of a shiftable stack assembly comprising two units A and B each consisting of 10 aisles, it will be understood from the foregoing description and the illustrations in the drawings that an operating system for a shiftable stack assembly in which units A and B consist of different aisle numbers from each other or consist of more than 10 aisles, can be readily obtained by a simple modification of the circuits described and illustrated herein.

Furthermore, although in the operating system using a qualification card, six kinds of qualification signals are formed by combining two basic qualification signals and the storage compartments are provided so as to be operated by these six qualification signals, it should be understood that the number of qualification signals may be increased or decreased easily by increasing or decreasing the number of basic qualification signals recorded on the qualification card and the number of reading elements for said signals. It should also be understood that where the qualification signal is desired to be held in strict secrecy, this may be readily attained by providing a number of basic qualification signals and composing a single qualification signal by the combination of three or more of these qualification signals. It is further to be understood that a storage compartment to be operated by a given qualification signal may be readily changed only by connecting electrically the six input lines in a qualification setting circuit, shown in FIGS. 20a and 20b, with the desired one of the output lines through which the respective storage compartments are opened and closed.

What is claimed is:

1. In a shiftable stack assembly comprising a multiplicity of stacks each having a plurality of defined accommodations for the storage of articles and movably arranged on a floor and disposed to be put together with no space left between adjacent stacks when access to them is not desired while a selected one of them is shifted to create an aisle between itself and the adjacent stack when access to said selected one stack is desired, an operating system including (1) power-actuated shifting means for said stacks, (2) means for receiving a position card having an aisle position information signal and detailed position information signals of a particular article storage accommodation within a given stack recorded thereon, (3) means for reading the information recorded on said card and transmitting the same as signals, (4) means for receiving signals from said reading means and energizing said power-actuated shifting means to move at least one of said stacks as necessary to create an aisle at a desired position according to information detected on said card by said reading means and transmitted thereby, and (5) means for indicating a particular article storage accommodation in accordance with detailed position information thereof detected on said card by said reading means and transmitted thereby.

2. A shiftable stack assembly according to claim 1 in which each of said article storage accommodations defined in the stacks thereof is provided with a lockable closure member and in which said operating system further includes (6) means for unlocking the closure member of any particular article storage accommodation in accordance with detailed position information thereof detected by said reading means.

3. A shiftable stack assembly according to claim 2 in which said operating system further includes (7) means for receiving a qualification card having at least one qualification information signal recorded thereon to restrict the operation of said assembly, (8) means for reading the information recorded on said qualification card and transmitting the same as at least one qualification signal, (9) means for receiving said qualification signal and controlling thereby the transmittal of signals representative of aisle position to said energizing means for said power-actuated shifting means, and (10) further means for receiving said qualification signal and also signals of detailed position information of any particular article storage accommodation and comparing said qualification and detailed position information signals and sending detailed position information signals to said means for indicating a particular article storage accommodation and the closure unlocking means for that accommodation only upon coincidence of said detailed position information with said qualification information.

4. A shiftable stack assembly according to claim 1 in which said operating system further includes (11) means for recording aisle position information and article storage accommodation detailed position information corresponding to said aisle position information signal and detailed position information signals of a particular article storage accommodation in accordance with said signals.

5. A shiftable stack assembly according to claim 2 in which said operating system further includes (11) means for recording aisle position information and article storage accommodation detailed position information corresponding to said aisle position information signal and detailed position information signals of a particular article storage accommodation in accordance with said signals.

6. A shiftable stack assembly according to claim 3 in which said operating system further includes (11) means for recording aisle position information and article storage accommodation detailed position information corresponding to said aisle position information signal and detailed position information signals of a particular article storage accommodation in accordance with said signals, and (12) means for recording said qualification signal.

7. In a shiftable stack assembly comprising a multiplicity of stacks each having a plurality of defined accommodations for the storage of articles and movably arranged on a floor and disposed to be put together with no space left between adjacent stacks when access to them is not desired while a selected one of them is shifted to create an aisle between itself and the adjacent stack when access to said selected one stack is desired with positions of the aisles formed between adjacent stacks and further detailed position information of particular article storage accommodations within given stacks being represented by code numbers 0 to 9, an operating system including (1) power-actuated shifting means for said stacks, (2) a set of signal transmitting numerical keys from 0 to 9, (3) means for receiving signals from said keys and converting said numerical codes into an aisle position signal and further detailed position signals of a particular article storage accommodation within a given stack in accordance with signals given by said keys and transmitting the position signals resulting from such conversions, (4) means for receiving signals from said converting means and energizing said power-actuated shifting means to move at least one of said stacks as necessary to create an aisle at a desired position according to said aisle position signal, and (5) means for indicating a particular article storage accommodation in accordance with said aisle position signal and said further detailed position signals.

8. A shiftable stack assembly according to claim 7 in which each of said article storage accommodations defined in the stacks thereof is provided with a lockable closure member and in which said operating system further includes (6) means for unlocking the closure member of any particular article storage accommodation in accordance with the detailed position signals thereof received.

9. A shiftable stack assembly according to claim 8 in which said operating system further includes (7) means for receiving a qualification card having at least one qualification information signal recorded thereon to restrict the operation of said assembly, (8) means for reading the information recorded on said qualification card and transmitting the same as at least one qualification signal, (9) means for receiving said qualification signal and controlling thereby the transmittal of signals representative of aisle position to said energizing means for said power-actuated shifting means, and (10) further means for receiving said qualification signal and also signals of detailed position information of any particular article storage accmomodation and comparing said qualification and detailed position signals and sending detailed position information signals to said means for indicating a particular article storage accommodation and the closure unlocking means for that accommodation only upon coincidence of said detailed position information with said qualification information.

10. A shiftable stack assembly according to claim 7 in which said operating system further includes (11) means for recording aisle position information and article storage accommodation detailed position information corresponding to said aisle position signal and detailed position signals of a particular article storage accommodation in accordance with said signals.

11. A shiftable stack assembly according to claim 8 in which said opertaing system further includes (11) means for recording aisle position information and article storage accommodation detailed position information corresponding to said aisle position signal and detailed position signals of a particular article storage accommodation in accordance with said signals.

12. A shiftable stack assembly according to claim 9 in which said operating system further includes (11) means for recording aisle position information and article storage accommodation detailed position information corresponding to said aisle position signal and detailed position signals of a particular article storage accommodation in accordance with said signals, and (12) means for recording said qualification signal.

References Cited

UNITED STATES PATENTS

| | | | |
|---|---|---|---|
| 2,654,489 | 10/1953 | Ingold | 312—199 |
| 3,168,361 | 2/1965 | Naito | 312—199 |

PATRICK D. LAWSON, Primary Examiner

UNITED STATES PATENT OFFICE
CERTIFICATE OF CORRECTION

Patent No. 3,615,122　　　　　　　　　Dated October 26, 1971

Inventor(s) Han-Ichiro Naito and Tsuneo Yamaguchi

It is certified that error appears in the above-identified patent and that said Letters Patent are hereby corrected as shown below:

Col. 4, line 43: for "initiate" read --indicate--. Col. 8, line 12: for "brake" read --break--. Col. 9, line 43: between "fl" and "dl" insert a comma. Col. 9, line 49: for "ten's" read --tens--. Col. 10, lines 22 and 23: for "contacts" read --contact--. Col. 10, line 31: for "fl" read --f0--. Col. 12, line 52: for "a0" read --A0--. Col. 13, line 17: for "a0" read --A0--. Col. 13, line 40: for "self-hold" read --self-held--. Col. 13, line 55: for "recewing" read --receiving--. Col. 14, line 66: for "and" read --to--. Col. 15, line 60: for "operatnig" read --operating--. Col. 17, line 6: for "ad" read --and--. Col. 18, line 60: between "the" and "aisle" insert --first--. Col. 19, line 46: between "side" and "first" insert a comma. Col. 20, line 52: for "23-L111" read --213-L111--. Col. 21, line 19: for "shift" read --shiftable--. Col. 21, line 24: for "operaton" read --operation--. Col. 22, line 68: "so" should be italicized. Col. 24, line 65: for "relays" read --relay--. Col. 26, lines 48, 49: for "secon" read --second--. Col. 27, line 1: for "360-0-f0" read --362-0-f0--. Col. 30, line 47: for "opeation" read --operation--. Col. 31, line 68: for "energizaiton" read --energization--. Col. 32, line 32: for "Dec." read --December--. Col. 34, line 3: for "ot" read --to--. Col. 34, line 18: for "embodbiment" read --embodiment--. Col. 34, line 20: for "2" read --"2"--. Col. 34, line 62: for "KL19" read --KL9--. Col. 38, line 4: for "opertaing" read --operating--.

Signed and sealed this 25th day of April 1972.

(SEAL)
Attest:

EDWARD M. FLETCHER, JR.　　　　　　　ROBERT GOTTSCHALK
Attesting Officer　　　　　　　　　　　Commissioner of Patents